(12) United States Patent
Meng et al.

(10) Patent No.: US 11,434,379 B2
(45) Date of Patent: Sep. 6, 2022

(54) COMPOSITION, ITS PREPARATION PROCESS, AND THE USE OF THE COMPOSITION AS A WATERPROOFING COAT

(71) Applicant: BASF SE, Ludwigshafen am Rhein (DE)

(72) Inventors: Lei Meng, Shanghai (CN); Sheng Zhong Zhou, Shanghai (CN); Alfons Smeets, Trostberg (DE); Harald Roeckel, Muenster (DE)

(73) Assignee: BASF SE, Ludwigshafen am Rhein (DE)

( * ) Notice: Subject to any disclaimer, the term of this patent is extended or adjusted under 35 U.S.C. 154(b) by 37 days.

(21) Appl. No.: 16/958,677

(22) PCT Filed: Dec. 18, 2018

(86) PCT No.: PCT/EP2018/085490
§ 371 (c)(1),
(2) Date: Jun. 27, 2020

(87) PCT Pub. No.: WO2019/129539
PCT Pub. Date: Jul. 4, 2019

(65) Prior Publication Data
US 2021/0062008 A1 Mar. 4, 2021

(30) Foreign Application Priority Data
Dec. 27, 2017 (WO) ............... PCT/CN2017/119094

(51) Int. Cl.
| | | |
|---|---|---|
| *C09D 167/06* | (2006.01) | |
| *C09D 133/14* | (2006.01) | |
| *C09D 5/00* | (2006.01) | |
| *C09D 7/61* | (2018.01) | |
| *C09D 7/63* | (2018.01) | |
| *C09D 4/06* | (2006.01) | |

(52) U.S. Cl.
CPC ............ *C09D 4/06* (2013.01); *C09D 5/00* (2013.01); *C09D 7/61* (2018.01); *C09D 7/63* (2018.01); *C09D 133/14* (2013.01); *C09D 167/06* (2013.01)

(58) Field of Classification Search
CPC ... C09D 7/63; C09D 7/61; C09D 4/06; C09D 5/00; C09D 133/14; C09D 167/06
USPC ........................................................ 524/165
See application file for complete search history.

(56) References Cited

U.S. PATENT DOCUMENTS

| | | | |
|---|---|---|---|
| 9,718,989 B1 * | 8/2017 | Palsule | ............... C09D 133/06 |
| 2012/0060830 A1 | 3/2012 | O'Grady | |
| 2017/0349702 A1 * | 12/2017 | Palsule | ............... C09D 167/06 |

FOREIGN PATENT DOCUMENTS

| | | |
|---|---|---|
| WO | 2012/054616 A2 | 4/2012 |
| WO | 2013/149173 A1 | 10/2013 |
| WO | 2017/210415 A1 | 12/2017 |

OTHER PUBLICATIONS

International Preliminary Report on Patentability received for PCT Patent Application No. PCT/EP2018/085490, dated Jul. 9, 2020, 8 pages.
International Search Report and Written Opinion received for PCT Patent Application No. PCT/EP2018/085490, dated Mar. 25, 2019, 9 pages.

* cited by examiner

*Primary Examiner* — Kelechi C Egwim
(74) *Attorney, Agent, or Firm* — Faegre Drinker Biddle & Reath LLP

(57) ABSTRACT

The invention relates to a composition, more particularly, to a two-component composition comprising component I comprising at least one methylene malonate monomer (A), at least one polymer (B) and at least one acidic stabilizer (C), and component comprising at least one alkali accelerator, to the preparation thereof, and to the use of the composition as a waterproofing coat in construction applications.

22 Claims, No Drawings

COMPOSITION, ITS PREPARATION PROCESS, AND THE USE OF THE COMPOSITION AS A WATERPROOFING COAT

CROSS-REFERENCE TO RELATED APPLICATIONS

This application is a national stage application (under 35 U.S.C. § 371) of PCT/EP2018/085490, filed Dec. 18, 2018, which claims benefit of Chinese Application No. PCT/CN2017/119094, filed Dec. 27, 2017, both of which are incorporated herein by reference in their entirety.

TECHNICAL FIELD

The present invention relates to a composition comprising methylene malonate monomer and polymer in construction field. Particularly, the invention relates to a two-component composition comprising component I comprising at least one methylene malonate monomer (A), at least one polymer (B) and at least one acidic stabilizer (C), and component II comprising at least one alkali accelerator, to the preparation thereof, and to the use of the composition as a waterproofing coat in construction applications.

BACKGROUND

Waterproofing materials mainly include coiled materials such as bitumen coiled material and polymer coiled material and reactive waterproofing coats. Coiled materials are used on flat surfaces but are not able to easily apply on irregular surfaces. And another problem for coiled materials is time-consuming operations like tailoring and seaming. Therefore, reactive waterproofing coats have advantage for substrates having irregular surfaces.

Reactive waterproofing coats are widely used in various constructions such as roof, basement, balconies, bridge, dams, river locks, dykes, marine cargo ports, docks, parking lots, pools, sewage, tunnels, mines as well as subway and railway tracks to prevent substrates like concrete from the corroding of water, frost, carbon dioxide etc. Waterproofing coats are required to have considerable elasticity, strength and low water vapor permeability in a broad range of temperature and humidity. Moreover, they are required to be fast curing and have good workability including sufficient open time and easy for constructors' handling.

Current reactive waterproofing coats are mainly based on polyurethane/polyurea and poly(meth)acrylate and epoxy resin. Polyurethane/polyuria-based waterproofing coats include one-component and two-component formulation systems but each of them has their own disadvantages. One-component system normally is slow curing and emitting strong odor due to the solvent. Two-component system is complicated to apply because certain specific equipment is required and an accurate proportion of two components is significant for the performance. In addition, the moisture tends to react with the isocyanate component to generate amine and carbon dioxide that cause pinholes in waterproofing coats or delamination between the substrates and waterproofing coats. And polyurethane/polyurea-based coats, in generally, are not environmental friendly due to the free isocyanates. One big disadvantage of poly(meth)acrylate-based waterproofing coats is strong odor from methyl methacrylate and furthermore, it is sensitive to radical inhibitor like oxygen that hinders the radical polymerization and therefore leads to a tacky surface of coats after curing. And as for epoxy resin-based waterproofing coats, it is slow curing especially at low temperature. it also requires accurate proportion of two components, which is complicated for the constructors. Moreover, part of its raw materials is not environmental friendly.

Therefore, it is still required to provide a reactive waterproofing coat that is fast curing, environmental friendly and has good workability in a wide range of temperature and humidity, as well as sufficient mechanical performance and chemical properties.

SUMMARY OF THE PRESENT INVENTION

An object of this invention is to provide a composition which, as a waterproofing coat, does not have the above deficiencies in the prior art. Particularly, an object of this invention is to provide a novel composition, wherein the methylene malonate monomer and the polymer thereof are mixed in a specific ratio. Such composition can undergo fast curing with a low amount of alkali accelerator, and can be applied in an extreme condition, such as at a low temperature and a high humidity level, and thus suitable for a construction application. The resulting cured product is substantially a 100% solid compound with no volatile organic compounds (VOC), and shows excellent performances in terms of chemical resistance, water absorption, elongation and the like.

Surprisingly, it has been found by the inventor that the above objection can be solved by a composition comprising Component I comprising (A) at least one of methylene malnnate monomer having formula (I)

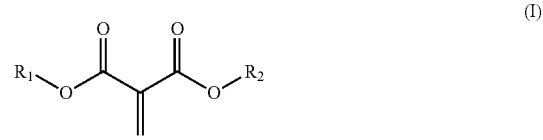

wherein, $R_1$ and $R_2$ are in each case independently selected from the group consisting of C1-C30-alkyl, C2-C30-alkenyl, C3-C30-cyclolalkyl, C2-C30-heterocyclyl, C2-C30-heterocyclyl-(C1-C30-alkyl), C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S;

(B) at least one methylene malonate polymer having formula (II):

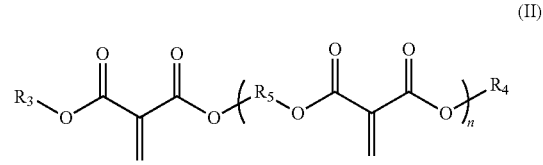

wherein, $R_3$ and $R_4$ are in each case independently selected from the group consisting of C1-C30-alkyl, C2-C30-alkenyl, C3-C30-cyclolalkyl, C2-C30-heterocyclyl, C2-C30-heterocyclyl-C1-C30-alkyl, C6-C30-aryl, C6-C30-aryl-(C1-C30-alkyl), 02-030-heteroaryl, C2-C30-heteroaryl-C1-C30- alkyl, C1-C30-alkoxy-C1-C30-alkyl, halo-C1-C30-alkyl, and halo-C3-C30-cycloalkyl, each of which radicals is optionally substituted, the heteroatom being selected from N, O and S;

n is an integer from 1 to 20;

$R_5$, if n=1 is, or if n>1 are in each case independently, selected from the group consisting of C1-C30-alkylene, C2-C30-alkenylene, C2-C30-alkynylene, C6-C30-arylene, C3-C30-cyclolalkylene, C3-C30-cyclolalkenylene, C3-C30-cyclolalkynylene, C2-C30-heterocyclylene, and C2-C30-heteroarylene, each of which radicals is optionally substituted, the heteroatom being selected from N, O and S, wherein R5 is optionally interrupted by a radical selected from N, O and S; and (C) at least one acidic stabilizer;

and Component II comprising at least one alkali accelerator;

wherein, the monomer (A) is in an amount of from 5 to 75 wt. %, preferably from 10 to 60 wt. %, more preferably from 20 to 55 wt. %, in each case based on the total weight of the monomer (A) and the polymer (B);

the acidic stabilizer (C) is in an amount of from 0.1 to 500 ppm, preferably from 0.1 to 300 ppm, more preferably from 0.1 to 200 ppm; and the component II is in an amount of from 0.01 to 10 wt. %, and preferably from 0.05 to 5 wt. %, and more preferably from 0.1 to 2 wt. %, in each case based on the total weight of the monomer (A) and the polymer (B).

In a further aspect, the invention relates to a mixture comprising the two-component composition according to the invention.

The two-component composition may be prepared by a process comprising steps of:

(1) mixing the monomer (A), the polymer (B) and the acidic stabilizer (C) to obtain the component I; and (2) preparing the component II.

It has been surprisingly found that the two-component composition according to this invention can be cured even at a low temperature below 0° C. and a high humidity level. The cured coating thus-obtained exhibit sufficient chemical resistance as well as waterproofing properties, and thus is suitable as a waterproofing coat in the construction field.

Thus, in a still further aspect, the invention relates to the use of the composition or the mixture according to the invention as a waterproofing coat.

DETAILED DESCRIPTION OF THE PRESENT INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the term "about" is understood to refer to a range of numbers that a person of skill in the art would consider equivalent to the recited value in the context of achieving the same function or result.

As used herein, the term "methylene malonate" refers to a compound having the core formula —O—C(O)—C(=CH$_2$)—C(O)—O—.

As used herein, the term "two-component" refers to a composition comprising two components, each of which may also be a mixture of several compounds. The two components can be blended together if needed. And the two components may also be two independent packages that can be mixed on the spot for applications.

As used herein, the term "RH" is equal to "Relative Humidity" and refers to the ratio of the partial vapor pressure of water to the saturated vapor pressure of water at a given temperature.

As used herein, the term "substantial absence" as in "substantial absence of the solvent" refers to a reaction mixture which comprises less than 1% by weight of the particular component as compared to the total reaction mixture. In certain embodiments, the "substantial absence" refers to less than 0.7%, less than 0.5%, less than 0.4%, less than 0.3%, less than 0.2% or less than 0.1% by weight of the particular component as compared to the total reaction mixture. In certain other embodiments, the "substantial absence" refers to less than 1.0%, less than 0.7%, less than 0.5%, less than 0.4%, less than 0.3%, less than 0.2% or less than 0.1% by volume of the particular component as compared to the total reaction mixture.

As used herein, the term "stabilized," e.g., in the context of "stabilized" monomers of the invention or compositions comprising the same, refers to the tendency of the monomers of the invention (or their compositions) to substantially not polymerize with time, to substantially not harden, form a gel, thicken, or otherwise increase in viscosity with time, and/or to substantially show minimal loss in cure speed (i.e., cure speed is maintained) with time as compared to similar compositions that are not stabilized.

As used herein, the term "shelf-life," e.g., as in the context of the compositions of the invention having an improved "shelf-life," refers to the compositions of the invention which are stabilized for a given period of time, e.g., 1 month, 6 months, or even 1 year or more.

As used herein, the term "additives" refers to additives included in a formulated system to enhance physical or chemical properties thereof and to provide a desired result. Such additives include, but are not limited to, dyes, pigments, toughening agents, impact modifiers, rheology modifiers, plasticizing agents, thixotropic agents, natural or synthetic rubbers, filler agents, reinforcing agents, thickening agents, opaciffers, inhibitors, fluorescence or other markers, thermal degradation reducers, thermal resistance conferring agents, surfactants, wetting agents, defoaming agents, dispersants, flow or slip aids, biocides, and stabilizers.

As used herein, the term "base" refers to a component having at least one electronegative group capable of initiating anionic polymerization.

As used herein the term "base precursor" refers to a component that may be converted to a base upon being acted upon in some manner, e.g., application of heat, chemical reaction, or UV activation.

As used herein, the term "base enhancer" refers to an agent that is capable of acting in some manner to improve or enhance the basicity of an agent.

As used herein, the term "halogen atom", "halogen", "halo-" or "Hal-" is to be understood as meaning a fluorine, chlorine, bromine or iodine atom.

As used herein, the term "alkyl", either on its own or else in combination with further terms, for example haloalkyl, is understood as meaning a radical of a saturated aliphatic hydrocarbon group and may be branched or unbranched, for example methyl, ethyl, propyl, butyl, isobutyl, pentyl, hexyl, heptyl, octyl, nonyl, decyl, undecyl or dodecyl, or an isomer thereof.

As used herein, the term "alkenyl", either on its own or else in combination with further terms, for example haloalkenyl, is understood as meaning a straight-chain or branched radical which has at least one double bond, for example vinyl, allyl, propenyl, butenyl, butadienyl, pentenyl, pentadienyl, hexenyl, or hexadienyl, or an isomer thereof.

As used herein, the term "alkynyl", either on its own or else in combination with further terms, for example haloalkynyl, is understood as meaning a straight-chain or branched radical which has at least one triple bond, for example ethynyl, propynyl,or propargyl, or an isomer thereof.

As used herein, the term "cycloalkyl", either on its own or else in combination with further terms, is understood as meaning a fused or non-fused, saturated, monocyclic or polycyclic hydrocarbon ring, for example cyclopropyl, cyclobutyl, cyclopentyl, cyclohexyl, cycloheptyl, or cyclooctyl, or an isomer thereof.

As used herein, the term "alkoxy", either on its own or else in combination with further terms, for example haloalkoxy, is understood as meaning linear or branched, saturated, group having a formula -0-alkyl, in which the term "alkyl" is as defined above, for example methoxy, ethoxy, propoxy, butoxy, pentoxy, or hexoxy, or an isomer thereof.

As used herein, the term "aryl", either on its own or else in combination with further terms, for example arylalkyl, is understood to include fused or non-fused aryl, such as phenyl or naphthyl, wherein phenyl is optionally substituted by 1 to 5 groups, and naphtyl is optionally substituted by 1 to 7 groups.

As used herein, the term "hetero-" is understood as meaning a saturated or unsaturated radical which is interrupted by at least one heteroatom selected from the group consisting of oxygen (0), nitrogen (N), and sulphur (S).

As used herein, the term "A- to B-member hetero-", for example "3- to 6-member hetero-", is understood as meaning a fused or non-fused, saturated or unsaturated monocyclic or polycyclic radical comprising, in addition to carbon atom, at least one heteroatom selected from the group consisting of oxygen (O), nitrogen (N), and sulphur (S), provided that the sum of the number of carbon atom and the number of heteroatom is within the range of A to B. The hetero groups according to this invention are preferably 5- to 30-member hetero groups, most preferably 6- to 18-member hetero groups, especially 6- to 12-member hetero groups, and particularly 6- to 8-member hetero groups.

As used herein, the term "heterocyclyl" is understood as including aliphatic or aromatic heterocyclyl, for example heterocyclylalkyl or heterocyclylalkenyl.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

The term "optionally substituted" means optional substitution with the specified groups, radicals or moieties. Unless stated otherwise, optionally substituted radicals may be mono- or polysubstituted, where the substituents in the case of polysubstitution may be the same or different.

As used herein, halogen-substituted radicals, for example haloalkyl, are mono- or polyhalogenated, up to the maximum number of possible substituents. In the case of polyhalogenation, the halogen atoms can be identical or different. In this case, halogen is fluorine, chlorine, bromine or iodine.

As used herein, the groups with suffix "-ene" represent the groups have two covalent bond which could be linked to other radicals, for example —CH$_2$CH(CH$_3$)CH$_2$— (isobutylene),

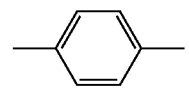

(phenylene), and in the case of phenylene, the covalent bond may be located in ortho-, meta-, or para-position.

Unless otherwise identified, all percentages (%) are "percent by weight".

The radical definitions or elucidations given above in general terms or within areas of preference apply to the end products and correspondingly to the starting materials and intermediates. These radical definitions can be combined with one another as desired, i.e. including combniations between the general definition and/or the respective ranges of preference and/or the embodiments.

Unless otherwise identified, the temperature refers to room temperature and the pressure refers to ambient pressure.

Unless otherwise identified, the solvent refers to all organic and inorganic solvents known to the persons skilled in the art and does not include any type of monomer molecular.

In one aspect, the invention provides a two-component composition comprising Component I comprising (A) at least one methylene malonate monomer having formula (I)

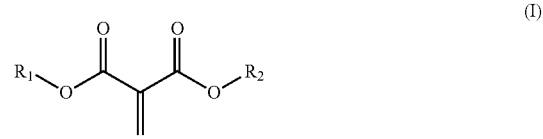

wherein, R$_1$ and R$_2$ are in each case independently selected from the group consisting of C1-C30-alkyl, C2-C30-alkenyl, C3-C30-cyclolalkyl, C2-C30-heterocyclyl, C2-C30-heterocyclyl-(C1-C30-alkyl), C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S;

(B) at least one methylene malonate polymer having formula (II)

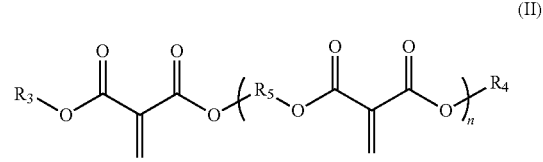

wherein, $R_3$ and $R_4$ are in each case independently selected from the group consisting of C1-C30-alkyl, C2-C30-alkenyl, C3-C30-cyclolalkyl, C2-C30-heterocyclyl, C2-C30-heterocyclyl-C1-C30-alkyl, C6-C30-aryl, C6-C30-aryl-(C1-C30-alkyl), C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S;

n is an integer from 1 to 20;

$R_5$, if n=1 is, or if n>1 are in each case independently, selected from the group consisting of C1-C30-alkylene, C2-C30-alkenylene, C2-C30-alkynylene, C6-C30-arylene, C3-C30-cyclolalkylene, C3-C30-cyclolalkenylene, C3-C30-cyclolalkynylene, C2-C30-heterocyclylene, and C2-C30-heteroarylene, each of which radicals is optionally substituted, the heteroatom being selected from N, O and S, wherein R5 is optionally interrupted by a radical selected from N, O and S; and (C) at least one acidic stabilizer;

and Component II comprising at least one alkali accelerator, wherein, the monomer (A) is in an amount of from 5 to 75 wt. %, preferably from 10 to 60 wt. %, more preferably from 20 to 55 wt. %, in each case based on the total weight of the monomer (A) and the polymer (B);

the acidic stabilizer (C) is in an amount of from 0.1 to 500 ppm, preferably from 0.1 to 300 ppm, more preferably from 0.1 to 200 ppm; and the component II is in an amount of from 0.01 to 10 wt. %, and preferably from 0.05 to 5 wt. %, and more preferably from 0.1 to 2 wt. %, in each case based on the total weight of the monomer (A) and the polymer (B).

In a preferred embodiment of the invention, $R_1$ and $R_2$ are in each case independently selected from the group consisting of C1-C10-alkyl, C2-C10-alkenyl, C3-C10-cyclolalkyl, C2-C10-hetercyclyl, C2-C10-heterocyclyl-C1-C10-alkyl, C3-C18-aryl, C3-C18-aryl-C1-C10-alkyl, C2-C10-heteroaryl, C2-C10-heteroaryl-C1-C10-alkyl, C1-C10-alkoxy-C1-C10-alkyl, halo-C1-C10-alkyl, and halo-C3-C10-cyclolalkyl, each of which radicals is optionally substituted, the heteroatom being selected from N, O and S.

Preferably, $R_1$ and $R_2$ are in each case independently selected from the group consisting of C1-C6-alkyl, C2-C6-alkenyl, C3-C6-cyclolalkyl, C3-C6-hetercyclyl, C3-C6-hetercyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl, each of which radicals is optionally substituted, the heteroatom being selected from N, O and S;

More preferably, $R_1$ and $R_2$ are in each case independently selected from the group consisting of C1-C6-alkyl, for example methyl, ethyl, n- or isopropyl, n-, iso-, tert- or 2-butyl, pentyls such as n-pentyl and isopentyl, hexyls such as n-hexyl, isohexyl and 1,3-dimethylbutyl;

According to still further preferred embodiment of the invention, wherein $R_1$ and $R_2$ are in each case independently selected from the group consisting of linear C1-C6-alkyl, for example methyl, ethyl, n-propyl, n-butyl, n-pentyl, n-hexyl;

In a preferred embodiment of the invention, $R_3$ and $R_4$ are in each case independently selected from the group consisting of C1-C10-alkyl, C2-C10-alkenyl, C3-C10-cyclolalkyl, C2-C10-hetercyclyl, C2-C10-hetercyclyl-C1-C10-alkyl, C3-C18-aryl, C3-C18-aryl-C1-C10-alkyl, C2-C10-heteroaryl, C2-C10-heteroaryl-C1-C10-alkyl, C1-C10-alkoxy-C1-C10-alkyl, halo-C1 -C10-alkyl, and halo-C3-C10-cyclolalkyl, each of which radicals may be optionally substituted, the heteroatom being selected from N, O and S.

Preferably, $R_3$ and $R_4$ are in each case independently selected from the group consisting of C1-C6-alkyl, C2-C6-alkenyl, C3-C6-cyclolalkyl, C3-C6-hetercyclyl, C3-C6-hetercyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl, each of which radicals may optionally substituted, the heteroatom being selected from N, O and S.

More preferably, $R_3$ and $R_4$ are in each case independently selected from the group consisting of C1-C6-alkyl, for example methyl, ethyl, n- or isopropyl, n-, iso-, tert- or 2-butyl, pentyls such as n-pentyl and isopentyl, hexyls such as n-hexyl, isohexyl and 1,3-dimethylbutyl.

According to still further preferred embodiment of the invention, wherein $R_3$ and $R_4$ are in each case independently selected from the group consisting of linear C1-C6-alkyl, for example methyl, ethyl, n-propyl, n-butyl, n-pentyl, n-hexyl.

In a preferred embodiment of the invention, $R_1$, $R_2$, $R_3$ and $R_4$ are the same.

Preferably, n is an integer from 1 to 15, more preferably from 1 to 10, much more preferably from 1 to 8, most preferably from 2-8 and especially from 3-6.

In a preferred embodiment of the invention, $R_5$, if n=1 is, or if n>1 are in each case independently, selected from the group consisting of C1-C10-alkylene, C2-C10-alkenylene, C2-C10-alkynylene, C3-C18-arylene, C3-C10-cyclolalkylene, C3-C10-cyclolalkenylene, C3-C10-cyclolalkynylene, C2-C10-hetercyclylene, and C2-C10-heteroarylene, each of which radicals is optionally substituted, the heteroatom being selected from N, O and S, wherein $R_5$ is optionally interrupted by a radical selected from N, O and S.

Preferably, $R_5$, if n=1 is, or if n>1 are in each case independently, selected from the group consisting of C1-C6-alkylene, C2-C6-alkenylene, C2-C6-alkynylene, C6-C8-arylene, C3-C6-cyclolalkylene, C3-C6-cyclolalkenylene, C3-C10-cyclolalkynylene, C3-C6-hetercyclylene, and C3-C6-heteroarylene, each of which radicals is optionally substituted, the heteroatom being selected from N, O and S, wherein $R_5$ is optionally interrupted by a radical selected from N, O and S.

More preferably, $R_5$, if n=1 is, or if n>1 are in each case independently, selected from the group consisting of C1-C6-alkylene and C6-C8-arylene, each of which radicals is optionally substituted by at least one C1-C6-alkyl.

Most preferably, $R_5$, if n=1 is, or if n>1 are in each case independently, selected from the group consisting of propylidene, pentylidene and phenylene, each of which radicals is optionally substituted by methyl.

Particularly, $R_5$ may be phenylene. It can be linked to other radicals in the main chain in its ortho-, meta-, or para-position, preferably para-position, i.e.

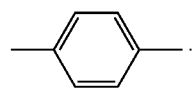

In a preferred embodiment of the invention, the radicals may be further substituted by substituents. Possible substituents may be selected from the group consisting of halogen, hydroxyl, nitro, cyano, C1-C10-alkyl, C2-C10-alkenyl, C2-C10-alkynyl, C1l-C10-alkoxy, C3-C10-cyclolalkyl, C2-C10-hetercyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, wherein the heteroatom is selected from N, O and S.

Preferably, the substituents may be selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-hetercyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S.

In a preferred embodiment of the invention, the monomer (A) is in an amount of from 5 to 75 wt. %, preferably from 10 to 70 wt. %, more preferably from 15 to 65 wt. %, much more preferably from 20 to 60 wt. %, and much more preferably from 25 to 55 wt. %, still preferably from 30 to 55 wt. %, and most preferably from 35 to 55 wt. %, in each case based on the total weight of the monomer (A) and the polymer (B).

In a preferred embodiment of the invention, the composition has a change rate of mass (%) concerning the base resistance and a water absorption rate (%), which are determined according to JSCE-E 549-2000, and they satisfy the following relation:

$$0.05\times10^{-2}\leq|C|^2/|W|\leq5\times10^{-2}$$

wherein, C is an abbreviation of change rate of mass concerning the base resistance, and W is an abbreviation of the water absorption rate. Hereinafter, the abbreviations "C" and "W" have the same meanings.

Preferably, the following relation is meet: $0.1\times10^{-2}\leq|C|^2/|W|\leq4\times10^{-2}$.

More preferably, the following relation is meet: $0.15\times10^{-2}\leq|C|^2/|W|\leq3\times10^{-2}$.

Still preferably, the following relation is meet: $0.2\times10^{-2}\leq|C|^2/|W|\leq2.5\times10^{-2}$.

Most preferably, the following relation is meet: $0.2\times10^{-2}\leq|C|^2/|W|\leq2\times10^{-2}$.

It has been surprisingly found that the technical solutions which satisfy the above relations have a superior balance between water absorption and elongation.

In each case, the compositions of the invention shall include one or more compounds to extend the shelf-life. In certain embodiments, the compositions are formulated such that the composition is stable for at least 6 months and preferably, is stable for at least one year. Said compounds comprise acidic stabilizer.

The present invention may use any suitable acidic stabilizer, for example, sulfuric acid ($H_2SO_4$), trifluoromethane sulfonic acid (TFA), trifluoromethane sulfonic acid, chlorodifluoro acid, maleic acid, methane sulfonic acid (MSA), p-toluenesulfonic acid (p-TSA), difluoro acetic acid, trichloroacetic acid, phosphoric acid, dichloroacetic acid or like acid. Preferably, the acidic stabilizers can be added into the monomer or polymer to extend shelf-life, e.g., by up to, for example, 1 year or more. Such acidic stabilizers may have a pKa in the range of, for example, between about −15 to about 5, or between about −15 to about 3, or between about −15 to about 1, or between about −2 to about 2, or between about 2 to about 5, or between about 3 to about 5.

In a preferred embodiment of the invention, the acidic stabilizer (C) is in an amount of from 0.1 to 500 ppm, preferably from 0.1 to 400, more preferably from 0.1 to 300 ppm, and much more preferably from 0.1 to 200 ppm.

According to an embodiment of the invention, the composition may further include an alkali accelerator.

According to a preferred embodiment of the invention, the alkali accelerator is in a form of a base, a base precursor, or a base enhance. Preferably, the alkali accelerator is at least one selected from metallic oxide, metallic hydroxide, amine, guanidine, amide, piperidine, piperazine, morpholine, pyridine, halides, salts of metal, ammonium, amine, wherein the anions in said salts is at least one selected from halogens, acetates, chloracetates, benzoates, aliphatic acids, alkene carboxylic acids, sulfurs, carbonates, silicates, diketones, monocarboxylic acids, polymers containing carboxylic acids.

And more preferably, the alkali accelerator is at least one selected from dimethylethylamine, dimethylpropylamine, 2-ethylhexylamine, di-(2-ethylhexyl)amine, dibutylamine, dicyclohexylamine, ditridecylamine mixture of isomers, N,N-dimethylisopropylamine, N-ethyldiisopropylamine, N,N-dimethylcyclohexylamine, N-Octylamine, tributylamine, tridecylamine mixture of isomers, tripropylamine, tris-(2-ethylhexyl)amine, triethylamine, trimethylamine, 2-(diisopropylamino)ethylamine, 3-(cyclohexylamino)propylamine, 3-(diethylamino)propylamine, 3,3'-dimethyl-4,4'-diaminodicyclohexylmethane, 4,4'-diaminodicyclohexylmethane, isophorone diamine, tetramethyl-1,6-hexanediamine, S-triazine, neopentanediamine (2,2-Dimethylpropane-1,3-diamine), octamethylenediamine, diethylenetriamine, dipropylene triamine, pentamethyldietylenetriamine, N,N-Bis-(3-aminopropyl)methylamine, N3-Amine 3-(2-Aminoethylamino)propylamine, N4-Amine N,N'-Bis-(3-Aminopropyl) ethylenediamine, 4,9-Dioxadodecane-1,12-diamine, di-(2-methoxyethyl)amine, bis(2-dimethylaminoethyl) ether, polyetheramine D 2000, polyetheramine D 230, polyetheramine D 400, polyetheramine T 403, polyetheramine T 5000, N,N-Dimethylcyclohexylamine, N-methylmorpholine, 2,2'-Dimorpholinodiethylether, dimethylaminoethoxyethanol, bis(2-dimethylaminoethyl)ether, pentamethyldietylenetriamine, trimethylaminoethylethanolamine, tetramethyl-1,6-hexanediamine, 1,8-diazabicyclo-5,4,0-undecene-7, 2,6-xylidine, 2-phenylethylamine, 4,4'-diaminodiphenylmethane, aniline, benzylamine, tris(dimethylaminomethyl)phenol, 2-dimethylaminomethylphenol (DMP10), diethanol-para-toluidine, diisopropanol-p-toluidine, N-(2-hydroxyethyl)aniline, N,N-di-(2-hydroxyethyl)aniline, N-ethyl-N-(2-hydroxyethyl)aniline, o-toluidine, p-nitrotoluene, 3-dimethylaminopropane-1-ol, butyldiethanolamine, triisopropanolamine, dibutylethanolamine, diethylethanolamine, methyldiethanolamine, methyldiisopropanolamine, N,N-dimethylethanolamine S, N,N-dimethylisopropanolamine, dimethylethanolamine, 4-(2-hydroxyethyl)morpholine, N,N,N',N'-Tetrakis(2-hydroxyethyl)ethylenediamine, sodium acetate, potassium acetate, zinc acetate, copper acetate, magnesium acetate, aluminium acetate, sodium chloracetate, potassium chloracetate, copper chloracetate, zinc chloracetate, magnesium chloracetate, aluminium chloracetate, ferric chloracetate, acid salts of sodium, potassium, lithium, copper, iron and cobalt, sodium oxide, potassium oxide, calcium oxide, zinc oxide, copper oxide, magnesium oxide, aluminium oxide, ferric and ferrous oxide, sodium hydroxide, potassium hydroxide, zinc hydroxide, copper hydroxide, magnesium hydroxide, aluminium hydroxide, calcium hydroxide, ferric and ferrous hydroxide, sodium silicate, potassium silicate, zinc silicate, copper silicate, magnesium silicate iron silicate, aluminium silicate, lithium chloride and tetramethyl guanidine.

In a preferred embodiment of the invention, the alkali accelerator is in an amount of from 0.01 to 10 wt. %, preferably from 0.05 to 8wt. %, more preferably from 0.1 to 5 wt. %, much more preferably from 0.2 to 3 wt. %, and most preferably from 0.5 to 1%, in each case based on the total weight of the monomer (A) and the polymer (B).

According to an embodiment of the invention, the mixture comprises the two-component composition according to the invention.

According to an embodiment of the invention, the mixture is substantial absence of solvent.

According to an embodiment of the invention, the mixture may further include other additives. In certain embodiments of the invention, the other additives may be at least one selected from plasticizers, thixotropic agents, adhesion promoters, antioxidants, light stabilizers, UV stabilizer, filler, cement, lime stone, surfactant, wetting agents, viscosity modifier, extenders, dispersants, anti-blocking agents, air release agents, anti-sagging agents, anti-setting agents, matting agents, flattening agents, waxes, anti-mar additives, anti-scratch additives, defoaming agent, or inert resins. In a preferred embodiment of the invention, the additives may be at least one selected from plasticizers, thixotropic agents, adhesion promoters, antioxidants, light stabilizers, UV stabilizer, filler, cement, lime stone, surfactant, wetting agents, viscosity modifier, dispersants, air release agents, anti-sagging agents, anti-setting agents, defoaming agent, coloring agent, fiber, polymer powder, mesh, chip, hollow spheres and inert resins.

For those skilled in the art, the above additives are commercially available. The above additives, if any, are presented in an amount commonly used in the art.

In other embodiments of the invention, the mixture may further include a coloring agent, including, but not limited to, organic pigment, organo-metallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury pigment, titanium pigment, aluminum pigment, manganese pigment, ultramarine pigment, zinc pigment, arsenic pigment, tin pigment, iron oxide pigment, antimonypigment, barium pigment, a biological pigment, dye, photochromic, conductive and liquid crystal polymer pigment, piezochromic pigment, goniochromaticpigment, silver pigment, diketopyrrolo-pyrrole, benzimidazolone, isoindoline, isoindolinone, radio-opacifier and the like.

For those skilled in the art, the above coloring agents are commercially available. The above additives, if any, are presented in an amount commonly used in the art.

The definitions and description concerning the composition also apply to the process and use of the present invention.

The composition according to the invention may be obtained by a process comprising steps of:

(1) mixing the monomer (A), the polymer (B) and the acidic stabilizer (C) to obtain the component I; and (2) preparing the component II.

In a preferred embodiment, the process for preparing the composition according to the invention comprises a) mixing the monomer (A) and the polymer (B) in amounts as described in the above; b) adding the acidic stabilizer (C) into the mixture obtained from step (a); and c) adding alkali accelerator into the mixture obtained from step (b).

The mixing used in the process is carried out by conventional means in the art in a unit suitable for mixing, for example, by stirring or agitating at a room temperature.

According to specifically aspects of the invention, the methylene malonate monomer having the formulas (I) could be prepared by those skilled in the art by means of the following steps: (a) reacting a malonic acid ester with a source of formaldehyde, optionally in the presence of an acidic or basic catalyst, and optionally in the presence of an acidic or non-acidic solvent, to form a reaction mixture; (b) contacting the reaction mixture or a portion thereof with an energy transfer means to produce a vapor phase comprising methylene malonate monomer; and (c) isolating the methylene malonate monomer from the vapor phase. For details on the above preparation process, please see WO2012/054616, which is incorporated herein in its entirety.

According to an embodiment of the invention, the polymer (B) having formula (II) could be prepared by those skilled in the art by means of the following steps: An appropriate amount of starting material (e.g., DEMM) and an appropriate amount of OH-containing linking group (e.g., diol) are mixed and reacted in the presence of a catalyst (e.g., Novazym 435), and the resulting mixture is stirred and heated for a period of time at a certain temperature, while the alcohol generated was removed by evaporation. Subsequently, the reaction mixture is cooled and stabilized with a minor amount of acid stabilizer, and then filtered to obtain the desired product. For details on the above preparation process, please see US2012060830, which is incorporated herein in its entirety.

In still another aspect, the invention relates to the use of the composition according to the invention as a waterproofing coat in the construction field.

Component I and component II are mixed before applying onto substrates or component II is applied onto substrates first and component I is applied onto substrates in next step.

The temperature for the use is from −30° C. to 60° C. and preferably from −20° C. to 40° C. And the relative humidity for the use is from 1% to 99% and preferably from 5% to 95%.

The composition according to the invention may be applied in a conventional way in the art. In a preferred embodiment, the monomer (A) and the polymer (B) are mixed with the acidic stabilizer (C) and an additive such as filler or UV stabilizer to give a ready-made formulation, and then adding an alkali accelerator such as triethylamine into the system, thereby obtaining a substantially 100% solid product. In a still preferred embodiment, the monomer (A) and the polymer (B) were firstly placed in a suitable vessel, and the acidic stabilizer (C) was added into the vessel, and the acidic stabilizer (C) was added into the vessel, thereby giving a ready-made formulation; subsequently, the alkali accelerator was coated on a flooring substrate, and then the readymade formulation was applied on the coated substrate.

In the present invention, coating or applying is carried out in a way known to those skilled in the art, for example by brushing, spraying, or roll coating. It is noted that the specific way of coating or applying used in the present invention depends on the workability of the composition; Particularly, long gel time is needed for roller coating, whereas short gel time is needed for spray coating.

In the embodiments of the present invention, the substrates of waterproofing to be coated comprise a concrete, wood, metal such as steel and resin layer. In a preferred embodiment, the resin layer comprises cement-based resin layer, epoxy-based resin layer, polyurethane-based resin layer, acrylate-based resin layer, polyethylene layer, polypropylene layer, polyvinyl chloride layer, rubber layer, bitumen layer and polymer-modified bitumen layer.

In the embodiments of the present invention, the two-component composition or the mixture is applied on wet substrates.

Embodiment

The following embodiments are used to illustrate the invention in more detail.

The 1st embodiment is a two-component composition comprising Component I comprising (A) at least one methylene malonate monomer having formula (I)

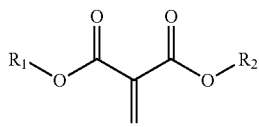
(I)

wherein, $R_1$ and $R_2$ are in each case independently selected from the group of C1-C30-alkyl;

(B) at least one methylene malonate polymer having formula (II):

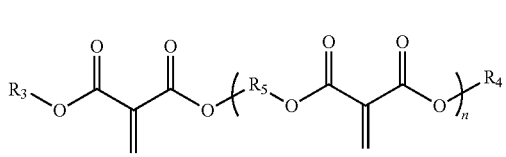
(II)

wherein, $R_3$ and $R_4$ are in each case independently selected from the group of C1-C30-alkyl;

n is an integer from 2 to 8; and $R_5$, if n=1 is, or if n>1 are in each case independently, selected from the group of C6-C30-arylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from sodium hydroxide, potassium hydroxide, zinc hydroxide, copper hydroxide, magnesium hydroxide, aluminum hydroxide, calcium hydroxide, sodium oxide, potassium oxide, zinc oxide, copper oxide, magnesium oxide, aluminum oxide, calcium oxide, sodium acetate, potassium acetate, zinc acetate, copper acetate, magnesium acetate, aluminum acetate, sodium chloracetate, potassium chloracetate, copper chloracetate, zinc chloracetate, magnesium chloracetate, aluminum chloracetate, sodium silicate, potassium silicate, zinc silicate, copper silicate, magnesium silicate and aluminum silicate, sodium propionate, potassium propionate, zinc propionate, copper propionate, magnesium propionate and aluminum propionate, sodium sorbate, potassium sorbate, zinc sorbate, copper sorbate, magnesium sorbate and aluminum sorbate, sodium benzoate, potassium benzoate, zinc benzoate, copper benzoate, magnesium benzoate and aluminum benzoate, 2-ethylhexylamine, N-Octylamine, tridecylamine, 3,3'-dimethyl-4,4'-diaminodicyclohexylmethane, 4,4'-diaminodicyclohexylmethane, isophorone diamine, neopentanediamine (2,2-Dimethylpropane-1,3-diamine), octamethylenediamine, dibutylethanolamine, 4,4'-diaminodiphenylmethane, benzylamine, polyetheramine D 2000, polyetheramine D 230, polyetheramine D 400, polyetheramine T 403, polyetheramine T 5000, di-(2-ethylhexyl)amine, dibutylamine, dicyclohexylamine, ditridecylamine, 4,9-Dioxadodecane-1,12-diamine, di-(2-methoxyethyl)amine, dimethylethylamine, dimethylpropylamine, N,N-dimethylisopropylamine, N-Ethyldiisopropylamine, N,N-dimethylcyclohexylamine, trimethylamine, triethylamine, tripropylamine, tributylamine, tris-(2-ethylhexyl)amine, 2-(diisopropylamino)ethylamine, tetramethyl-1,6-hexanediamine, S-triazine, pentamethyldietylenetriamine, bis(2-dimethylaminoethyl) ether, N,N-Dimethylcyclohexylamine, bis(2-dimethylaminoethyl)ether, pentamethyldietylenetriamine, trimethylaminoethylethanolamine, tetramethyl-1,6-hexanediamine, tris(dimethylaminomethyl)phenol, 2-dimethylaminomethylphenol (DMP10), 3-(cyclohexylamino)propylamine, diethylenetriamine, dipropylene triamine, 3-(2-aminoethylamino)propylamine, N,N'-Bis-(3-Aminopropyl)ethylenediamine, 3-(diethylamino)propylamine, N,N-Bis-(3-aminopropyl)methylamine, butyldiethanolamine, triisopropanolamine, diethylethanolamine, methyldiethanolamine, methyldiisopropanolamine, N,N-dimethylethanolamine S, N,N-dimethylisopropanolamine, dimethylethanolamine, N,N,N',N'-Tetrakis(2-hydroxyethyl)ethylenediamine, dimethylaminoethoxyethanol, diethanol-para-toluidine, diisopropanol-p-toluidine, 3-dimethylaminopropane-1-ol, 2,6-xylidine, 2-phenylethylamine, aniline, N-(2-hydroxyethyl)aniline, N,N-di-(2-hydroxyethyl)aniline, N-ethyl-N-(2-hydroxyethyl)aniline, o-toluidine, p-nitrotoluene, lithium chloride, N-Methylmorpholine, 4-(2-hydroxyethyl)morpholine, 2,2'-Dimorpholinodiethylether, ammonium salts and amine salts and the anions for such salts comprising halogens, acetates, chloracetate, benzoates, aliphatic acids, alkene carboxylic acid, sulfur, carbonates, silicates, diketone, monocarboxylic acid, carboxylic acid containing polymers, wherein, the monomer (A) is in an amount of 10 to 60 wt. %, and the acidic stabilizer (C) is in an amount of 0.1 to 150 ppm, and the component II is in an amount of 0.01 to 5 wt. %, in each case based on the total weight of the monomer (A) and the polymer (B).

The 2nd embodiment is a two-component composition comprising Component I comprising (A) at least one methylene malonate monomer having formula (I)

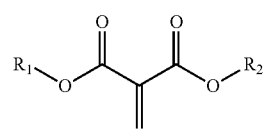
(I)

wherein, $R_1$ and $R_2$ are in each case independently selected from the group consisting of C1-C30-alkyl, C2-C30-alkenyl, C3-C30-cycloalkyl, C6-C30-aryl, halo-C1-C30-alkyl;

(B) at least one methylene malonate polymer having formula (II):

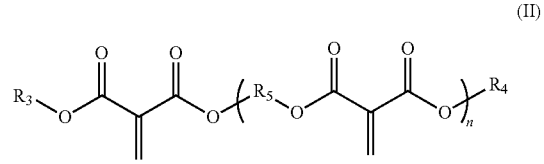
(II)

wherein, $R_3$ and $R_4$ are in each case independently selected from the group consisting of C1-C30-alkyl, C2-C30-alkenyl, C3-C30-cycloalkyl, C6-C30-aryl, halo-C1-C30-alkyl;

n is an integer from 3 to 6; and $R_5$, if n=1 is, or if n>1 are in each case independently, selected from the group of C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from sodium hydroxide, potassium hydroxide, zinc hydroxide, copper hydroxide, magnesium hydroxide, aluminum hydroxide, calcium hydroxide, sodium acetate, potassium acetate, zinc acetate, copper acetate, magnesium acetate, aluminum acetate, sodium chloracetate, potassium chloracetate, copper chloracetate, zinc chloracetate, magnesium chloracetate, aluminum chloracetate, sodium silicate, potassium silicate, zinc silicate, copper silicate, magnesium silicate and aluminum silicate, sodium propionate, potassium propionate, zinc propionate, copper propionate, magnesium propionate and aluminum propionate, sodium sorbate, potassium sorbate, zinc sorbate, copper sorbate, magnesium sorbate and aluminum sorbate, sodium benzoate, potassium benzoate, zinc benzoate, copper benzoate, magnesium benzoate and aluminum benzoate, 2-ethylhexylamine, N-Octylamine, tridecylamine, 3,3'-dimethyl-4,4'-diaminodicyclohexylmethane, 4,4'-diaminodicyclohexylmethane, isophorone diamine, neopentanediamine(2,2-Dimethylpropane-1,3-diamine), octamethylenediamine, dibutylethanolamine, 4,4'-diaminodiphenylmethane, benzylamine, polyetheramine D 2000, polyetheramine D 230, polyetheramine D 400, polyetheramine T 403, polyetheramine T 5000, di-(2-ethylhexyl)amine, dibutylamine, dicyclohexylamine, ditridecylamine, 4,9-Dioxadodecane-1,12-diamine, di-(2-methoxyethyl)amine, dimethylethylamine, dimethylpropylamine, N,N-dimethylisopropylamine, N-Ethyldiisopropylamine, N,N-dimethylcyclohexylamine, trimethylamine, triethylamine, tripropylamine, tributylamine, tris-(2-ethylhexyl)amine, 2-(diisopropylamino)ethylamine, tetramethyl-1,6-hexanediamine, S-triazine, pentamethyldietylenetriamine, bis(2-dimethylaminoethyl) ether, N,N-Dimethylcyclohexylamine, bis(2-dimethylaminoethyl)ether, pentamethyldietylenetriamine, trimethylaminoethylethanolamine, tetramethyl-1,6-hexanediamine, tris(dimethylaminomethyl)phenol, 2-dimethylaminomethylphenol (DMP10), 3-(cyclohexylamino)propylamine, diethylenetriamine, dipropylene triamine, 3-(2-aminoethylamino)propylamine, N,N'-Bis-(3-Aminopropyl)ethylenediamine, 3-(diethylamino)propylamine, N,N-Bis-(3-aminopropyl)methylamine, butyldiethanolamine, triisopropanolamine, diethylethanolamine, methyldiethanolamine, methyldiisopropanolamine, N,N-dimethylethanolamine S, N,N-dimethylisopropanolamine, dimethylethanolamine, N,N,N',N'-Tetrakis(2-hydroxyethyl)ethylenediamine, dimethylaminoethoxyethanol, diethanol-para-toluidine, diisopropanol-p-toluidine, 3-dimethylaminopropane-1-ol, 2,6-xylidine, 2-phenylethylamine, aniline, N-(2-hydroxyethyl)aniline, N,N-di-(2-hydroxyethyl)aniline, N-ethyl-N-(2-hydroxyethyl)aniline, o-toluidine, p-nitrotoluene, lithium chloride, wherein, the monomer (A) is in an amount of 10 to 60 wt. %, and the component (C) is in an amount of 0.1 to 120 ppm, and the component II is in an amount of 0.01 to 2 wt. %, in each case based on the total weight of the monomer (A) and the polymer (B).

The 3$^{rd}$ embodiment is a two-component composition comprising Component I comprising (A) at least one methylene malonate monomer having formula (I)

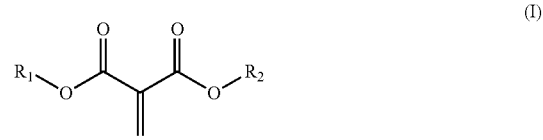

wherein, $R_1$ and $R_2$ are in each case independently selected from the group consisting of e C1-C30-alkyl, C2-C30-alkenyl, C3-C30-cycloalkyl, C6-C30-aryl, halo-C1-C30-alkyl;

(B) at least one methylene malonate polymer having formula (II):

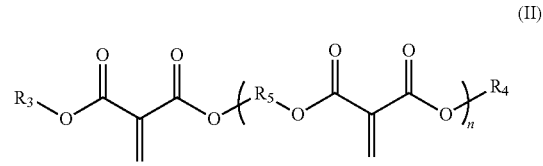

wherein, $R_3$ and $R_4$ are in each case independently selected from the group consisting of C1-C30-alkyl, C2-C30-alkenyl, C3-C30-cycloalkyl, C6-C30-aryl, halo-C1-C30-alkyl;

n is an integer from 3 to 6; and $R_5$, if n=1 is, or if n>1 are in each case independently, selected from the group of C1-C30-alkylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from calcium hydroxide, sodium silicate, sodium propionate, sodium benzoate, 2-dimethylaminomethylphenol (DMP10), N,N,N',N'-Tetrakis(2-hydroxyethyl)ethylenediamine, lithium chloride, 2,2'-Dimorpholinodiethylether, wherein, the monomer (A) is in an amount of 10 to 60 wt. %, and the component (C) is in an amount of 0.1 to 120 ppm, and the component II is in an amount of 0.05 to 2 wt. %, in each case based on the total weight of the monomer (A) and the polymer (B).

The 4$^{th}$ embodiment is a two-component composition comprising Component I comprising (A) at least one methylene malonate monomer having formula (I)

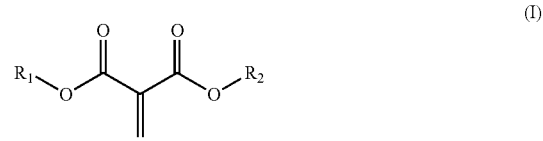

wherein, $R_1$ and $R_2$ are in each case independently selected from the group consisting of C1-C30-alkyl, C2-C30-alkenyl and C3-C30-cyclolalkyl (B) at least one methylene malonate polymer having formula (II):

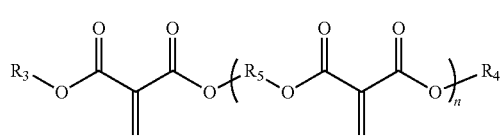

(II)

wherein, $R_3$ and $R_4$ are in each case independently selected from the group consisting of C1-C30-alkyl, C2-C30-alkenyl and C3-C30-cyclolalkyl n is an integer from 2 to 8; and $R_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from 2-ethylhexylamine, N-Octylamine, tridecylamine, 3,3'-dimethyl-4,4'-diaminodicyclohexylmethane, 4,4'-diaminodicyclohexylmethane, isophorone diamine, neopentanediamine (2,2-Dimethylpropane-1,3-diamine), octamethylenediamine, dibutylethanolamine, 4,4'-diaminodiphenylmethane, benzylamine, polyetheramine D 2000, polyetheramine D 230, polyetheramine D 400, polyetheramine T 403, polyetheramine T 5000, di-(2-ethylhexyl) amine, dibutylamine, dicyclohexylamine, ditridecylamine, 4,9-Dioxadodecane-1,12-diamine, di-(2-methoxyethyl) amine, dimethylethylamine, dimethylpropylamine, N,N-dimethylisopropylamine, N-Ethyldiisopropylamine, N,N-dimethylcyclohexylamine, trimethylamine, triethylamine, tripropylamine, tributylamine, tris-(2-ethylhexyl)amine, 2-(diisopropylamino)ethylamine, tetramethyl-1,6-hexanediamine, S-triazine, pentamethyldietylenetriamine, bis(2-dimethylaminoethyl) ether, N,N-Dimethylcyclohexylamine, bis(2-dimethylaminoethyl)ether, pentamethyldietylenetriamine, trimethylaminoethylethanolamine, tetramethyl-1,6-hexanediamine, tris(dimethylaminomethyl)phenol, 2-dimethylaminomethylphenol (DMP10), 3-(cyclohexylamino)propylamine, diethylenetriamine, dipropylene triamine, 3-(2-aminoethylamino)propylamine, N,N'-Bis-(3-Aminopropyl)ethylenediamine, 3-(diethylamino)propylamine, N,N-Bis-(3-aminopropyl) methylamine, butyldiethanolamine, triisopropanolamine, diethylethanolamine, methyldiethanolamine, methyldiisopropanolamine, N,N-dimethylethanolamine S, N,N-dimethylisopropanolamine, dimethylethanolamine, N,N,N',N'-Tetrakis(2-hydroxyethyl)ethylenediamine, dimethylaminoethoxyethanol, diethanol-para-toluidine, diisopropanol-p-toluidine, 3-dimethylaminopropane-1-ol, 2,6-xylidine, 2-phenylethylamine, aniline, N-(2-hydroxyethyl)aniline, N,N-di-(2-hydroxyethyl)aniline, N-ethyl-N-(2-hydroxyethyl)aniline, o-toluidine, p-nitrotoluene, wherein, the monomer (A) is in an amount of 10 to 60 wt. %, and the component (C) is in an amount of 0.1 to 120 ppm, and the component II is in an amount of 0.05 to 2 wt. %, in each case based on the total weight of the monomer (A) and the polymer (B).

The 5$^{th}$ embodiment is a two-component composition comprising Component I comprising (A) at least one methylene malonate monomer having formula (I)

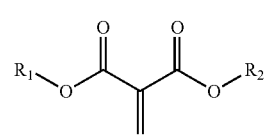

(I)

wherein, $R_1$ and $R_2$ are in each case independently selected from the group consisting of C1-C30-alkyl, C2-C30-alkenyl and C3-C30-cyclolalkyl (B) at least one methylene malonate polymer having formula (II):

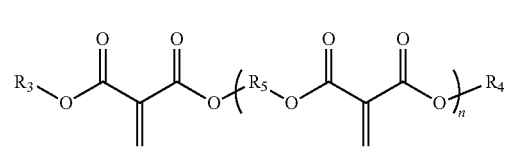

(II)

wherein, $R_3$ and $R_4$ are in each case independently selected from the group consisting of C1-C30-alkyl, C2-C30-alkenyl and C3-C30-cyclolalkyl n is an integer from 2 to 8; and $R_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from sodium hydroxide, potassium hydroxide, zinc hydroxide, copper hydroxide, magnesium hydroxide, aluminum hydroxide, calcium hydroxide, wherein, the monomer (A) is in an amount of 20 to 55 wt. %, and the acidic stabilizer (C) is in an amount of 0.1 to 120 ppm, and the component II is in an amount of 0.05 to 2 wt. %, in each case based on the total weight of the monomer (A) and the polymer (B).

The 6$^{th}$ embodiment is a two-component composition comprising Component I comprising (A) at least one methylene malonate monomer having formula (I)

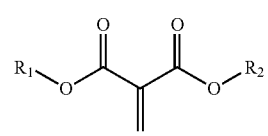

(I)

wherein, $R_1$ and $R_2$ are in each case independently selected from the group consisting of C1-C30-alkyl, C2-C30-alkenyl and C3-C30-cyclolalkyl (B) at least one methylene malonate polymer having formula (II):

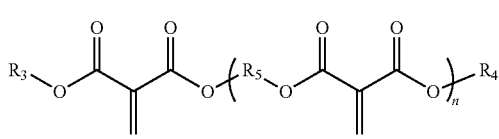

(II)

wherein, $R_3$ and $R_4$ are in each case independently selected from the group consisting of C1-C30-alkyl, C2-C30-alkenyl and C3-C30-cyclolalkyl n is an integer from 2 to 8; and $R_5$, if n=1 is, or if n>1 are in each case independently, selected from the group consisting of C1-C30-alkylene and C6-C30-arylene; and (C) at least one selected from trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from sodium acetate, potassium acetate, zinc acetate, copper acetate, magnesium acetate, aluminum acetate, sodium chloracetate, potassium chloracetate, copper chloracetate, zinc chloracetate, magnesium chloracetate, aluminum chloracetate, sodium silicate, potassium silicate, zinc silicate, copper silicate, magnesium silicate and aluminum silicate, sodium propionate, potassium propionate, zinc propionate, copper propionate, magnesium propionate and aluminum propionate, sodium sorbate, potassium sorbate, zinc sorbate, copper sorbate, magnesium sorbate and aluminum sorbate, sodium benzoate, potassium benzoate, zinc benzoate, copper benzoate, magnesium benzoate and aluminum benzoate, wherein, the monomer (A) is in an amount of 20 to 55 wt. %, and the component (C) is in an amount of 0.1 to 120 ppm, and the component II is in an amount of 0.05 to 2 wt. %, in each case based on the total weight of the monomer (A) and the polymer (B).

The 7$^{th}$ embodiment is a two-component composition comprising Component I comprising (A) at least one methylene malonate monomer having formula (I)

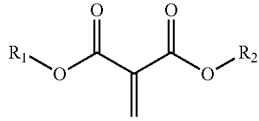

(I)

wherein, $R_1$ and $R_2$ are in each case independently selected from the group consisting of C1-C30-alkyl, C2-C30-alkenyl and C3-C30-cyclolalkyl (B) at least one methylene malonate polymer having formula (II):

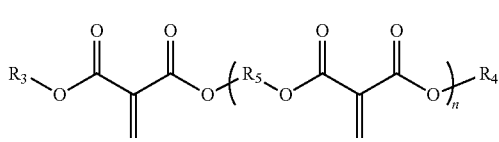

(II)

wherein, $R_3$ and $R_4$ are in each case independently selected from the group consisting of C1-C30-alkyl, C2-C30-alkenyl and C3-C30-cyclolalkyl n is an integer from 2 to 8; and $R_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from calcium hydroxide, sodium silicate, sodium propionate, sodium benzoate, 2-dimethylaminomethylphenol (DMP10), N,N,N',N'-Tetrakis(2-hydroxyethyl)ethylenediamine, lithium chloride, 2,2'-Dimorpholinodiethylether, wherein, the monomer (A) is in an amount of 20 to 55 wt. %, and the component (C) is in an amount of 0.1 to 120 ppm, and the component II is in an amount of 0.1 to 2 wt. %, in each case based on the total weight of the monomer (A) and the polymer (B).

The 8$^{th}$ embodiment is a two-component composition comprising Component I comprising (A) at least one methylene malonate monomer having formula (I)

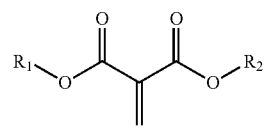

(I)

wherein, $R_1$ and $R_2$ are in each case independently selected from the group consisting of C1-C30-alkyl, C2-C30-alkenyl and C3-C30-cyclolalkyl;

(B) at least one methylene malonate polymer having formula (II):

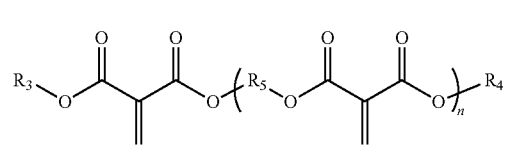

(II)

wherein, $R_3$ and $R_4$ are in each case independently selected from the group consisting of C1-C30-alkyl, C2-C30-alkenyl and C3-C30-cyclolalkyl;

n is an integer from 2 to 8; and $R_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from calcium hydroxide, sodium silicate, sodium propionate, sodium benzoate, 2-dimethylaminomethylphenol (DMP10), N,N,N',N'-Tetrakis(2-hydroxyethyl)ethylenediamine, lithium chloride, 2,2'-Dimorpholinodiethylether, wherein, the monomer (A) is in an amount of 20 to 55 wt. %, and the acidic stabilizer (C) is in an amount of 0.1 to 120 ppm, and the component II is in an amount of 0.1 to 2 wt. %, in each case based on the total weight of the monomer (A) and the polymer (B).

The 9$^{th}$ embodiment is a two-component composition comprising Component I comprising (A) at least one methylene malonate monomer having formula (I)

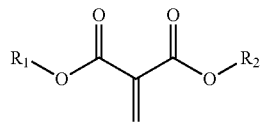

(I)

wherein, $R_1$ and $R_2$ are in each case independently selected from the group consisting of C1-C30-alkyl, C2-C30-alkenyl and C3-C30-cyclolalkyl (B) at least one methylene malonate polymer having formula (II):

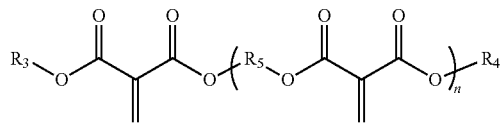

(II)

wherein, $R_3$ and $R_4$ are in each case independently selected from the group consisting of C1-C30-alkyl, C2-C30-alkenyl and C3-C30-cyclolalkyl n is an integer from 2 to 8; and $R_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from calcium hydroxide, sodium silicate, sodium propionate, sodium benzoate, 2-dimethylaminomethylphenol (DMP10), N,N,N',N'-Tetrakis(2-hydroxyethyl)ethylenediamine, lithium chloride, 2,2'-Dimorpholinodiethylether, wherein, the monomer (A) is in an amount of 20 to 55 wt. %, and the component (C) is in an amount of 0.1 to 120 ppm, and the component II is in an amount of 0.1 to 2 wt. %, in each case based on the total weight of the monomer (A) and the polymer (B).

The 10$^{th}$ embodiment is a two-component composition comprising Component I comprising (A) at least one methylene malonate monomer having formula (I)

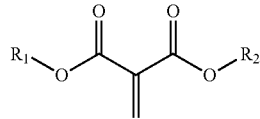

(I)

wherein, $R_1$ and $R_2$ are in each case independently selected from the group of C1-C30-alkyl;

(B) at least one methylene malonate polymer having formula (II):

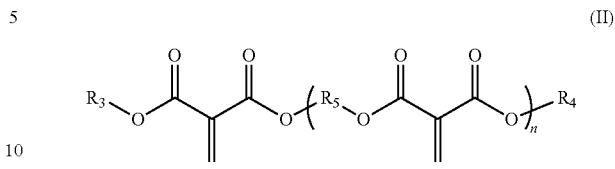

(II)

wherein, $R_3$ and $R_4$ are in each case independently selected from the group consisting of C1-C30-alkyl, n is an integer from 3 to 6; and $R_5$, if n=1 is, or if n>1 are in each case independently, selected from the group consisting of C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from calcium hydroxide, sodium silicate, sodium propionate, sodium benzoate, 2-dimethylaminomethylphenol (DMP10), N,N,N',N'-Tetrakis(2-hydroxyethyl)ethylenediamine, lithium chloride, 2,2'-Dimorpholinodiethylether, wherein, the monomer (A) is in an amount of 30 to 50 wt. %, and the component (C) is in an amount of 0.1 to 120 ppm, and the component II is in an amount of 0.1 to 2 wt. %, in each case based on the total weight of the monomer (A) and the polymer (B).

The 11$^{th}$ embodiment is a two-component composition comprising Component I comprising (A) at least one methylene malonate monomer having formula (I)

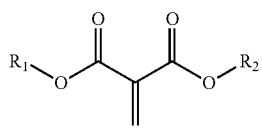

(I)

wherein, $R_1$ and $R_2$ are in each case independently selected from the group of C1-C30-alkyl, (B) at least one methylene malonate polymer having formula (II):

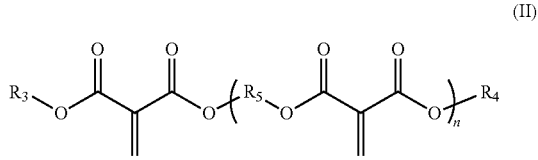

(II)

wherein, $R_3$ and $R_4$ are in each case independently selected from the group of C1-C30-alkyl;

n is an integer from 3 to 6; and $R_5$, if n=1 is, or if n>1 are in each case independently, selected from the group consisting of C1-C30-alkylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from triethylamine, tris(dimethylaminomethyl)phenol and 2-dimethylaminomethylphenol (DMP10), wherein, the monomer (A) is in an amount of 30 to 50 wt. %, and the acidic stabilizer (C) is in an amount of 0.1 to 100 ppm, and the component II is in an amount of 0.05 to 2 wt. %, in each case based on the total weight of the monomer (A) and the polymer (B).

The 12$^{th}$ embodiment is a two-component composition comprising Component I comprising (A) at least one methylene malonate monomer having formula (I)

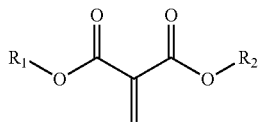

(I)

wherein, R$_1$ and R$_2$ are in each case independently selected from the group of C6-C30-aryl;

(B) at least one methylene malonate polymer having formula (II):

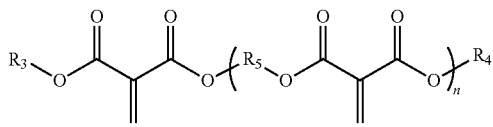

(II)

wherein, R$_3$ and R$_4$ are in each case independently selected from the group of C1-C30-alkyl, n is an integer from 2 to 8; and R$_5$, if n=1 is, or if n>1 are in each case independently, selected from the group consisting of C1-C30-alkylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from 2-ethylhexylamine, N-Octylamine, tridecylamine, 3,3'-dimethyl-4,4'-diaminodicyclohexylmethane, 4,4'-diaminodicyclohexylmethane, isophorone diamine, neopentanediamine (2,2-Dimethylpropane-1,3-diamine), octamethylenediamine, dibutylethanolamine, 4,4'-diaminodiphenylmethane, benzylamine, polyetheramine D 2000, polyetheramine D 230, polyetheramine D 400, polyetheramine T 403, polyetheramine T 5000, di-(2-ethylhexyl)amine, dibutylamine, dicyclohexylamine, ditridecylamine, 4,9-Dioxadodecane-1,12-diamine, di-(2-methoxyethyl)amine, dimethylethylamine, dimethylpropylamine, N,N-dimethylisopropylamine, N-Ethyldiisopropylamine, N,N-dimethylcyclohexylamine, trimethylamine, triethylamine, tripropylamine, tributylamine, tris-(2-ethylhexyl)amine, 2-(diisopropylamino)ethylamine, tetramethyl-1,6-hexanediamine, S-triazine, pentamethyldietylenetriamine, bis(2-dimethylaminoethyl) ether, N,N-Dimethylcyclohexylamine, bis(2-dimethylaminoethyl)ether, pentamethyldietylenetriamine, trimethylaminoethylethanolamine, tetramethyl-1,6-hexanediamine, tris(dimethylaminomethyl)phenol, 2-dimethylaminomethylphenol (DMP10), 3-(cyclohexylamino)propylamine, diethylenetriamine, dipropylene triamine, 3-(2-aminoethylamino)propylamine, N,N'-Bis-(3-Aminopropyl)ethylenediamine, 3-(diethylamino)propylamine, N,N-Bis-(3-aminopropyl)methylamine, butyldiethanolamine, triisopropanolamine, diethylethanolamine, methyldiethanolamine, methyldiisopropanolamine, N,N-dimethylethanolamine S, N,N-dimethylisopropanolamine, dimethylethanolamine, N,N,N',N'-Tetrakis(2-hydroxyethyl)ethylenediamine, dimethylaminoethoxyethanol, diethanol-para-toluidine, diisopropanol-p-toluidine, 3-dimethylaminopropane-1-ol, 2,6-xylidine, 2-phenylethylamine, aniline, N-(2-hydroxyethyl)aniline, N,N-di-(2-hydroxyethyl)aniline, N-ethyl-N-(2-hydroxyethyl)aniline, o-toluidine, p-nitrotoluene, wherein, the monomer (A) is in an amount of 30 to 50 wt. %, and the acidic stabilizer (C) is in an amount of 0.1 to 100 ppm, and the component II is in an amount of 0.05 to 2 wt. %, in each case based on the total weight of the monomer (A) and the polymer (B).

The 13$^{th}$ embodiment is a two-component composition comprising Component I comprising (A) at least one methylene malonate monomer having formula (I)

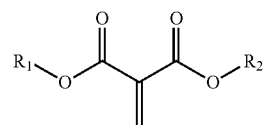

(I)

wherein, R$_1$ and R$_2$ are in each case independently selected from the group consisting of C2-C30-alkenyl, C2-C30-alkenyl and C3-C30-cyclolalkyl;

(B) at least one methylene malonate polymer having formula (II):

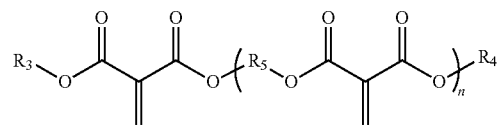

(II)

wherein, R$_3$ and R$_4$ are in each case independently selected from the group consisting of C1-C30-alkyl, C2-C30-alkenyl and C3-C30-cyclolalkyl;

n is an integer from 2 to 8; and

R$_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from 2-(diisopropylamino)ethylamine, 3-(cyclohexylamino)propylamine, 3-(diethylamino)propylamine, 3,3'-dimethyl-4,4'-diaminodicyclohexylmethane, 4,4'-diaminodicyclohexylmethane, isophorone diamine, tetramethyl-1,6-hexanediamine, neopentanediamine (2,2-Dimethylpropane-1,3-diamine), octamethylenediamine, wherein, the monomer (A) is in an amount of 30 to 50 wt. %, and the acidic stabilizer (C) is in an amount of 0.1 to 100 ppm, and the component II is in an amount of 0.05 to 2 wt. %, in each case based on the total weight of the monomer (A) and the polymer (B).

The 14$^{th}$ embodiment is a two-component composition comprising Component I comprising (A) at least one methylene malonate monomer having formula (I)

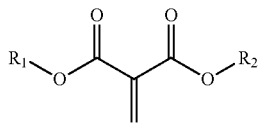

wherein, $R_1$ and $R_2$ are in each case independently selected from the group consisting of C2-C30-alkenyl, C2-C30-alkenyl and C3-C30-cyclolalkyl;

(B) at least one methylene malonate polymer having formula (II):

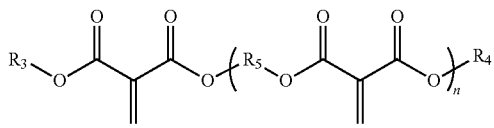

wherein, $R_3$ and $R_4$ are in each case independently selected from the group consisting of C1-C30-alkyl, C2-C30-alkenyl and C3-C30-cyclolalkyl;

n is an integer from 2 to 8; and $R_5$, if n=1 is, or if n>1 are in each case independently, selected from the group consisting of C1-C30-alkylene and C6-C30-arylene; and (C) at least one selected from sulfuric acid, trifluoromethane sulfonic acid, chlorodifluoro acid, maleic acid, methane sulfonic acid, difluoroacetic acid, trichloroacetic acid, phosphoric acid, dichloroacetic acid and phenol;

and Component II comprising at least one selected from 2-ethylhexylamine, di-(2-ethylhexyl)amine, dibutylamine, dicyclohexylamine, ditridecylamine mixture of isomers, N,N-Dimethylcyclohexylamine, N-Octylamine, tributylamine, tridecylamine mixture of isomers, tripropylamine, tris-(2-ethylhexyl)amine, triethylamine, wherein, the monomer (A) is in an amount of 30 to 50 wt. %, and the acidic stabilizer (C) is in an amount of 0.1 to 100 ppm, and the component II is in an amount of 0.05 to 2 wt. %, in each case based on the total weight of the monomer (A) and the polymer (B).

The 15$^{th}$ embodiment is a mixture comprising the composition according to any one of embodiments 1-14 which further comprises one or more additives selected from the group consisting of plasticizers, thixotropic agents, adhesion promoters, antioxidants, light stabilizers, UV stabilizer, filler, cement, lime stone, surfactant, wetting agents, viscosity modifier, dispersants, air release agents, anti-sagging agents, anti-setting agents, defoaming agent, coloring agent, fiber, polymer powder, mesh, chip, hollow spheres and inert resins.

The 16th embodiment is a mixture comprising the composition according to any one of embodiments 1-14 which further comprises one or more additives selected from the group consisting of plasticizers, thixotropic agents, surfactant, UV stabilizer, filler, cement, lime stone and defoaming agent.

The 17$^{th}$ embodiment is a mixture comprising the composition according to any one of embodiments 1-14, which further comprises one or more additives selected from the group consisting of antioxidants, light stabilizers, UV stabilizers and fillers.

The 18$^{th}$ embodiment is a mixture comprising the composition according to any one of embodiments 1-14, which further comprises one or more additives selected from the group consisting of light stabilizers, pigments, air release agents and defoaming agent.

The 19$^{th}$ embodiment is a mixture comprising the composition according to any one of embodiments 1-14, which further comprises other additives selected from the group consisting of UV stabilizers pigments, air release agents and fillers.

The 20$^{th}$ embodiment is a mixture comprising the composition according to any one of embodiments 1-14, which further comprises other additives selected from the group consisting of antioxidants, UV stabilizers, air release agents, defoaming agent and fillers.

EXAMPLE

The present invention will now be described with reference to Examples and Comparative Examples, which are not intended to limit the present invention.

The following starting materials were used:

Diethyl malonate (DEM) and Dihexyl malonate (DHM) were purchased from Alfa Aesar. Paraformaldehyde, potassium acetate, copper (II) acetate, Novazym 435 as a catalyst were purchased from Acros Organics. Phosphoric acid, 1,5-pentanediol, 2-methylpropane-1,3-diol, 1,4-phenylenedimethanol were purchased from Alfa Aesar.

Analytical Methods (1) NMR (Nuclear Magnetic Resonance)

Routine one-dimensional NMR spectroscopy was performed on either a 400 MHz Varian® spectrometer or a 400 MHz Bruker® spectrometer. The samples were dissolved in deuterated solvents. Chemical shifts were recorded on the ppm scale and were referenced to the appropriate solvent signals, such as 2.49 ppm for DMSO-d6, 1.93 ppm for CD3CN, 3.30 ppm for CD3OD, 5.32 ppm for CD2C12 and 7.26 ppm for CDCl3 for 1H spectra.

(2) GC-MS (Gas Chromatography Mass Spectrometer)

GC-MS was obtained with a Hewlett Packard 5970 mass spectrometer equipped Hewlett Packard 5890 Gas Chromatograph with. The ion source was maintained at 270° C.

(3) El-MS (Electron Impact Mass Spectra)

El-MS were obtained with a Hewlett Packard 5970 mass spectrometer equipped Hewlett Packard 5890 Gas Chromatograph with. The ion source was maintained at 270° C.

Measurement Methods (1) Gel Time

Gel time means the time from the start of the mixture of the component I and the component II until becoming the state of viscous, and it depends on the workability of the composition; particularly, long gel time (for example 20-30 min) is needed for roller coating, whereas short gel time (for example 1-5 min) is needed for spray coating.

(2) Dry Through Time

Dry through Time means the time from the start of mixing component I and II to the solid state of the mixture.

(3) Hardness

Hardness Shored D is determined according to DIN53505.

(4) Chemical Resistance

Chemicals (such as bases) resistance is determined according to JSCE-E 549-2000 by the following procedure:

a. Add a base into a container, and keep a constant temperature at 50° C.

b. Soaking the samples in solution.

c. Take out the samples after a period of time.

d. After cleaning and drying, the surface quality such as blisters, wrinkles, of paint is evaluated essentially by visual inspection.

The difference of mass before and after immersion, expressed as a percentage of one hundred (%).

(5) Elongation and Tensile Strength

Elongation and Tensile Strength are each determined according to DIN 53504.

(6) Water Absorption

Water Absorption is determined according to ASTM D 570-2010 at 60° C.

(7) Water Vapor Permeability

Water vapor permeability is determined according to ASTM E 96. A range of 0.1-20 g/(m²day) is acceptable.

Preparation Example

I. The Preparation of the Monomer (A)

Example 1: The Preparation of Diethyl Methylenemalonate (DEMM)

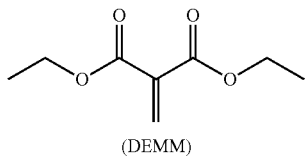

(DEMM)

<1>. In a two-liter 3-neck round bottom flask (equipped with a condenser), 60 g of paraformaldehyde (2 mol), 10 g of potassium acetate and 10 g of copper (II) acetate were mixed in 80 ml of tetrahydrofuran (THF).

<2>. This mixture was stirred and heated at 65° C. for 40 min. From an additional funnel, 160 g (1 mol) of diethyl malonate (DEM) was then added dropwise to the reaction mixture.

<3>. At the end of the addition of DEM (about an hour), the reaction mixture was further stirred at 65° C. for 2 hours.

<4>. The reaction mixture was then cooled to room temperature and 10 g of sulfuric acid was added into the flask with stirring.

<5>. The precipitates were then removed by filtration and the filtrate was collected. 0.01 g of sulfuric acid (60 ppm) was added to the collected filtrate.

<6>. The filtrate was then distilled at reduced pressure. Diethyl Methylenemalonate was collected at 55-70° C. with about 1.5 mm Hg of vacuum as the crude monomer.

<7>. The crude monomer (with 60 ppm of sulfuric acid) was further fractionally distilled with stainless steel packed column under reduced vacuum. This gives 141 g (yield of 82%, purity of 98%) pure monomer.

<8>. The monomer was stabilized with 40 ppm of sulfuric acid.

1H-NMR (400 MHz, CDCl3) δ 6.45 (s, 2H), 4.22 (q, 4H), 1.24 (t, 6H). GC-MS (m/z): 172, 145, 127, 99, 55.

Example 2: The Preparation of Dihexyl Methylene Malonate (DHMM)

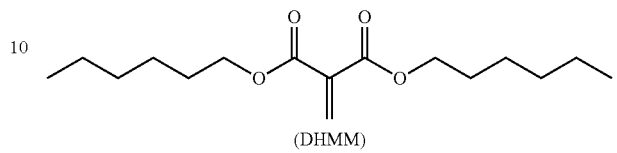

(DHMM)

The preparation is carried out according to Example 1, except for using dihexyl malonate in step 2. This gives 182 g (yield of 80%, purity of 95%) pure monomer. The monomer was stabilized with 60 ppm of sulfuric acid.

GC-MS (m/z): 284

II. The Preparation of the Polymer (B)

Example 3: The Preparation of polymer (B-1)

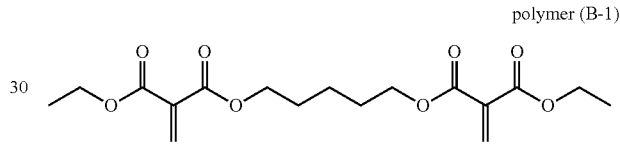

polymer (B-1)

In a round flask (equipped with a condenser), 0.5 g Novazym 435 (catalyst), 17.3 g DEMM (0.1 mol) and 4.2 g 1,5-pentanediol (0.04 mol) were added. The mixture was stirred and heated at 65° C. for 6 hours, while the alcohol generated was removed through evaporation. The reaction mixture was then cooled to room temperature and stabilized with 10 ppm phosphoric acid. The reaction mixture was filtered to remove the catalyst. This gives the desired product.

ESI-MS (m/z): 357

Example 4: The Preparation of Polymer (B-2)

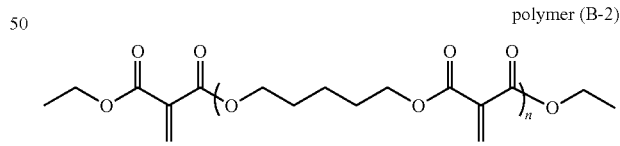

polymer (B-2)

In a round flask (equipped with a condenser), 0.5 g Novazym 435 (catalyst), 17.3 g DEMM (0.1 mol) and 8.3 g 1,5-pentanediol (0.08 mol) were added. The mixture was stirred and heated at 65° C. for 6 hours, while the alcohol generated was removed through evaporation. The reaction mixture was then cooled to room temperature and stabilized with 10 ppm phosphoric acid. The reaction mixture was filtered to remove the catalyst. This gives the desired product, wherein n is an integer from 2 to 8.

ESI-MS (m/z): 541 (n=2), 725 (n=3), 909 (n=4), 1093 (n=5), 1277 (n=6), 1461 (n=7), 1645 (n=8).

Example 5: The Preparation of Polymer (B-3)

polymer (B-3)

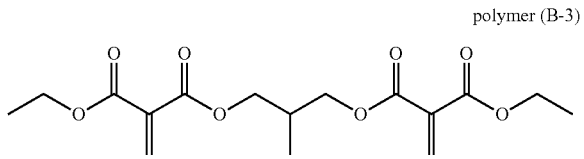 [SMILES: C=C(C(=O)OCC)C(=O)OCC(C)COC(=O)C(=C)C(=O)OCC]

In a round flask (equipped with a condenser), 0.5 g Novazym 435 (catalyst), 17.3 g DEMM (0.1 mol) and 3.6 g 2-methylpropane-1,3-diol (0.04 mol) were added. The mixture was stirred and heated at 65° C. for 6 hours, while the alcohol generated was removed through evaporation. The reaction mixture was then cooled to room temperature and stabilized with 10 ppm phosphoric acid. The reaction mixture was filtered to remove the catalyst. This gives the desired product.

ESI-MS (m/z): 343

Example 6: The Preparation of Polymer (B-4)

polymer (B-4)

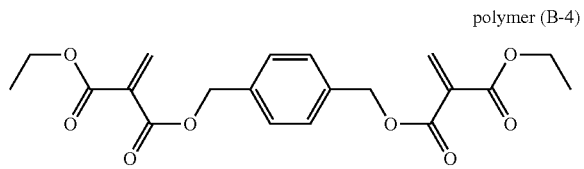 [SMILES: C=C(C(=O)OCC)C(=O)OCc1ccc(COC(=O)C(=C)C(=O)OCC)cc1]

In a round flask (equipped with a condenser), 0.5 g Novazym 435 (catalyst), 17.3 g DEMM (0.1mol) and 5.52 g 1,4-phenylenedimethanol (0.04 mol) were added. The mixture was stirred and heated at 65 for 6 hours, while the alcohol generated was removed through evaporation. The reaction mixture was then cooled to room temperature and stabilized with 10 ppm phosphoric acid. The reaction mixture was filtered to remove the catalyst. This gives the desired product.

ESI-MS (m/z): 391

Example 7: The Preparation of Polymer (B-5)

polymer (B-5)

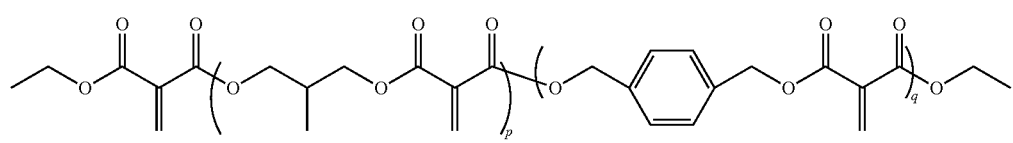

In a round flask (equipped with a condenser), 0.5 g Novazym 435 (catalyst), 17.3 g DEMM (0.1 mol) 3.6 g 2-methylpropane-1,3-diol (0.04 mol) and 5.52 g 1,4-phenylenedimethanol (0.04 mol) were added. The mixture was stirred and heated at 65° C. for 6 hours, while the alcohol generated was removed through evaporation. The reaction mixture was then cooled to room temperature and stabilized with 10 ppm phosphoric acid. The reaction mixture was filtered to remove the catalyst. This gives the desired product, wherein n is an integer from 2 to 8.

ESI-MS (m/z): 561 (p=1, q=1), 779 (p=1, q=2), 731 (p=2, q=1), 949 (p=2, q=2), 997 (p=1, q=3), 901 (p=3, q=1), 1215 (p=1, q=4), 1167 (p=2, q=3), 1119 (p=3, q=2), 1071 (p=4, q=1), 1433 (p=1, q=5), 1385 (p=2, q=4), 1337 (p=3, q=3), 1289 (p=4, q=2), 1241 (p=5, q=1)

III. The Preparation of Composition

Example 8

In the respective blending proportions shown in table 1, the monomer (A) and the polymer (B) were first placed in a glass vessel with a magnetic stir bar. While stirring, without heating, at 900 rpm, the acidic stabilizer (C) was added into the vessel. The mixture is continuously stirred for an additional 5 minutes. This gives a ready-made component I Then, component II was added to component I and then was applied onto the surface of the concrete board, and then a 2.5 gauge Meyer rod was used to drag component II down on the concrete board resulting in a 0.2 mm film 1. Then the formulation was cast on concrete slab using a 14 gauge Meyer rod resulting in a 1 mm film 2.

TABLE 1

The components of the two-component compositions in Example A, Example B and Comparative Example

| Composition | | | Inventive composition 1 | Inventive composition 2 | Comparative composition |
|---|---|---|---|---|---|
| Component I | (A): Monomer (% by weight) | DEMM | 10 | 5 | 2 |
| | | DHMM | | 50 | 80 |
| | (B): Polymer (% by weight) | Polymer (B-1) | 40 | 20 | 8 |
| | | Polymer (B-2) | 50 | 25 | 10 |
| | (C): Acidic stabilizer (ppm) | MSA | 21 | 30.5 | 29.5 |
| | | $H_2SO_4$ | 8 | 5.5 | 9 |
| | | TFA | 12 | 9.5 | 8.5 |
| Component II | DMP10 (% by weight) | | 0.5 | 0.5 | 0.5 |
| $0.1 \times 10^{-2} \le |C|^2/|W| \le 5 \times 10^{-2}$ | | | $0.21 \times 10^{-2}$ | $1.86 \times 10^{-2}$ | $8.7 \times 10^{-2}$ |

Note:
C is an abbreviation of change rate of mass concerning the base resistance, and W is an abbreviation of the water absorption rate.

Example 9

Gel time and dry through time of the inventive compositions 1 and 2 and the Comparative composition were tested. The results are shown in the following table 2.

TABLE 2

| Test | | Inventive composition 1 | Inventive composition 2 | Comparative composition |
|---|---|---|---|---|
| Gel time (minutes) | −20° C.; 10% RH | 35 | 25 | 14 |
| | 25° C.; 50% RH | 43 | 32 | 20 |
| | 35° C.; 90% RH | 32 | 22 | 7 |
| Dry through Time (minutes) Layer thickness: 1 mm | −20° C.; 10% RH | 50 | 29 | 37 |
| | 25° C.; 50% RH | 60 | 39 | 45 |
| | 35° C.; 90% RH | 45 | 30 | 25 |
| Dry through Time (minutes) Layer thickness: 0.2 mm | −20° C.; 10% RH | 60 | 32 | 46 |
| | 25° C.; 50% RH | 75 | 44 | 59 |
| | 35° C.; 90% RH | 65 | 40 | 43 |

It should be noted that it is acceptable that the waterproofing has a gel time of from 2 s to 2 h and a dry through time of less than 8 h. From the above, it shows that the inventive compositions 1 and 2 have excellent workability and controlled curing compared to that of Comparative composition.

Example 10: Test of Chemical Resistance and Mechanical Properties

The test samples were prepared by mixing the monomer (A), the polymer (B) and the acidic stabilizer (C) in amounts according to table 1 at 25° C. and under atmospheric pressure, forming the component I, and then the resulting component I were combined with the component II in amounts according to table 1 under the same temperature and pressure. The samples from Example B differs from the samples from Example A in that the compositions in this text were not in practice applied onto a substrate but were cured as per se. However, the compositions of Examples A and B have the same structure/composition Base resistance was tested and the results are shown in table 3 below.

TABLE 3

The data of the base resistance

| Composition | | | Inventive composition 1 | Inventive composition 2 | Comparative composition |
|---|---|---|---|---|---|
| Base Resistance (5 wt. % NaOH) | Mass (g) | 0 day | 4.131 | 4.643 | 4.542 |
| | | 30 days | 4.146 | 4.700 | 4.310 |
| | The change of mass (%) | | 0.36 | 1.22 | −5.11 |
| | Shore D | 0 day | 72.7 | 46.7 | N.A. |
| | | 30 days | 74.3 | 44.3 | N.A. |

Note:
i) N.A means that the sample was easily broken under touch and cannot be made a standard bar for testing, and thus cannot be measured. Hereinafter, N.A has the same meaning.
ii) The change rate of mass (%) = $(m_{30} − m_0)/m_0$, wherein $m_{30}$ and $m_0$ are the mass value of the samples on day 0 and day 30, respectively.

From the above, it shows that Inventive compositions 1 and 2 each have a smaller change in the mass (i.e.0.36% and 1.22%) than Comparative composition (i.e. −5.11%), showing that the compositions of the invention have better base resistance compared with that of Comparative composition. In addition, it shows that the mass of the comparative composition was decreased over time. It is assumed that the decrease in mass is due to the sample being dissolved in NaOH, which also proves that the sample of Comparative composition has an inferior base resistance.

In addition, as shown from the values of Shore D, Inventive compositions 1 and 2 are essentially constant before and after immersing in the base, showing that the compositions of the invention are not or little affected by the base, which also proves that they have excellent base resistance, whereas Comparative composition cannot be measured because sample was destroyed by base.

Example 11: The Test Samples were Obtained by the Same Process of Example B. Water Absorption was Tested and the Results are Shown in Table 4 Below

TABLE 4

The data of the water absorption

| Composition | | | Inventive composition 1 | Inventive composition 2 | Comparative composition |
|---|---|---|---|---|---|
| Water absorption | Mass (g) | 0 day | 5.418 | 5.738 | 5.260 |
| | | 30 days | 5.452 | 5.784 | 5.102 |
| | Water absorption rate (%) | | 0.63 | 0.80 | −3.00 |
| | Shore D | 0 day | 75 | 47 | N.A. |
| | | 30 days | 70 | 42 | N.A. |

Note:
Water absorption rate (%) = $(m_{30} − m_0)/m_0 \times 100\%$, wherein $m_{30}$ and $m_0$ are the mass value of the samples on day 0 and day 30, respectively.

From the above, it also shows that Inventive compositions 1 and 2 each have lower water absorption rate (i.e. 0.63% and 0.80%) than Comparative composition (i.e. −3.00%), showing that the samples of the invention have excellent waterproofing effect. In addition, it shows that the mass of the comparative composition was decreased over time. It is assumed that the decrease in mass is due to the cracking of the sample, which also proves that the sample of Comparative composition has an inferior waterproofing.

In addition, as shown from the values of Shore D, Inventive compositions 1 and 2 are essentially constant before and after immersing in the water, showing that the compositions of the invention are not or little affected by the water, which also proves that they have excellent waterproofing effect, whereas Comparative composition cannot be measured because of its breakability.

Example 12

The test samples were obtained by the same process of Example B. Mechanical properties were tested and the results are shown in table 5 below.

TABLE 5

The data of the mechanical properties

| Composition | | Inventive composition 1 | Inventive composition 2 | Comparative composition |
|---|---|---|---|---|
| Elongation (%) | 0 day | 10 | 13 | N.A. |
| | 7 days at 60° C. | 8.5 | 10 | N.A. |
| | Retention rate (%) | 85% | 76.9% | N.A. |
| Tensile Strength (MPa) | | 16 | 3 | N.A. |

It should be noted that it is advantage that the waterproofing coat has an elongation ranging from 5% to 50% so that it is not easy to break during use.

From the above, it shows that Inventive compositions 1 and 2 each have an elongation within from 5% to 50% and a relatively high retention rate of the elongation, showing that the samples of the invention are suitable as a waterproofing material, whereas Comparative compositions cannot be measured because the sample obtained is brittle Example 13

The test samples were obtained by the same process of Example B. Water vapor permeability properties were tested and the results are shown in table 6 below.

TABLE 6

The data of the water vapor permeability

| Composition | Inventive composition 1 | Inventive composition 2 | Comparative composition |
|---|---|---|---|
| Water vapor permeability (g/m²day) | 3.27 | 4.76 | N.A. |

From the above, it shows that Inventive compositions 1 and 2 have water vapor permeability of 3.27 and 4.76 respectively, showing that the samples of the invention are suitable as a waterproofing material, whereas Comparative composition cannot be measured these values because the sample obtained is brittle.

The structures, materials, compositions, and methods described herein are intended to be representative examples of the invention, and it will be understood that the scope of the invention is not limited by the scope of the examples. Those skilled in the art will recognize that the invention may be practiced with variations on the disclosed structures, materials, compositions, and methods, and such variations are regarded as within the ambit of the invention. Thus, it is intended that the present invention cover such modifications and variations as come within the scope of the appended claims and their equivalents.

The invention claimed is:

1. A two-component composition comprising Component I comprising
    (A) at least one methylene malonate monomer having formula (I)

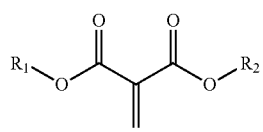

(I)

wherein, $R_1$ and $R_2$ are in each case independently selected from the group consisting of C1-C30-alkyl, C2-C30-alkenyl, C3-C30-cyclolalkyl, C2-C30-heterocyclyl, C2-C30-heterocyclyl-C1-C30-alkyl, C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S,
    (B) at least one methylene malonate polymer having formula (II):

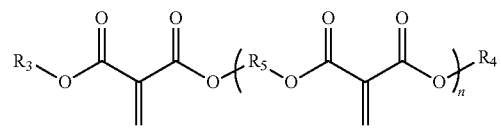

(II)

wherein, $R_3$ and $R_4$ are in each case independently selected from the group consisting of C1-C30-alkyl, C2-C30-alkenyl, C3-C30-cyclolalkyl, C2-C30-heterocyclyl, C2-C30-heterocyclyl-C1-C30-alkyl, C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S;
n is an integer from 1 to 20;
$R_5$, if n=1 is, or if n>1 are in each case independently, selected from the group consisting of C1-C30-alkylene, C2-C30-alkenylene, C2-C30-alkynylene, C6-C30-arylene, C3-C30-cyclolalkylene, C3-C30-cyclolalkenylene, C3-C30-cyclolalkynylene, C2-C30-heterocyclylene, and C2-C30-heteroarylene, each of which radicals is optionally substituted, the heteroatom being selected from N, O and S, wherein $R_5$ is optionally interrupted by a radical selected from N, O and S; and
    (C) at least one acidic stabilizer;
    and Component II comprising at least one alkali accelerator,
wherein, the monomer (A) is in an amount of from 5 to 75 wt % in each case based on the total weight of the monomer (A) and the polymer (B);
the acidic stabilizer (C) is in an amount of from 0.1 to 500 ppm; and
the component II is in an amount of from 0.01 to 10 wt %, in each case based on the total weight of the monomer (A) and the polymer (B).

2. The two-component composition according to claim 1, wherein the two-component composition includes two independent packages of component I and component II that may be mixed on the spot for applications of the composition.

3. The two-component composition according to claim 1, wherein $R_1$ and $R_2$ are in each case independently selected from the group consisting of C1-C10-alkyl, C2-C10-alkenyl, C3-C10-cyclolalkyl, C2-C10-heterocyclyl, C2-C10-heterocyclyl-C1-C10-alkyl, C3-C18-aryl, C3-C18-aryl-C1-C10-alkyl, C2-C10-heteroaryl, C2-C10-heteroaryl-C1-C10-alkyl, C1-C10-alkoxy-C1-C10-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-heterocyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, the heteroatom being selected from N, O and S;
$R_3$ and $R_4$ are in each case independently selected from the group consisting of C1-C10-alkyl, C2-C10-alkenyl, C3-C10-cyclolalkyl, C2-C10-heterocyclyl, C2-C10-heterocyclyl-C1-C10-alkyl, C3-C18-aryl, C3-C18-aryl-C1-C10-alkyl, C2-C10-heteroaryl, C2-C10-heteroaryl-C1-C10-alkyl, C1-C10-alkoxy-C1-C10-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-heterocyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, the heteroatom being selected from N, O and S;

n is an integer from 1 to 15;

$R_5$, if n=1 is, or if n>1 are in each case independently, selected from the group consisting of C1-C10-alkylene, C2-C10-alkenylene, C2-C10-alkynylene, C3-C18-arylene, C3-C10-cyclolalkylene, C3-C10-cyclolalkenylene, C3-C10-cyclolalkynylene, C2-C10-heterocyclylene, and C2-C10-heteroarylene, each of which radicals is optionally substituted by at least one radical selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-heterocyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, the heteroatom being selected from N, O and S, wherein $R_5$ is optionally interrupted by a radical selected from N, O and S.

4. The two-component composition according to claim 1, wherein $R_1$ and $R_2$ are in each case independently selected from the group consisting of C1-C6-alkyl, C2-C6-alkenyl, C3-C6-cyclolalkyl, C3-C6-heterocyclyl, C3-C6-heterocyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-heterocyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S;

$R_3$ and $R_4$ are in each case independently selected from the group consisting of C1-C6-alkyl, C2-C6-alkenyl, C3-C6-cyclolalkyl, C3-C6-heterocyclyl, C3-C6-heterocyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-heterocyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S;

n is an integer from 1 to 10;

$R_5$, if n=1 is, or if n>1 are in each case independently, selected from the group consisting of C1-C6-alkylene, C2-C6-alkenylene, C2-C6-alkynylene, C6-C8-arylene, C3-C6-cyclolalkylene, C3-C6-cyclolalkenylene, C3-C10-cyclolalkynylene, C3-C6-heterocyclylene, and C3-C6-heteroarylene; each of which radicals is optionally substituted by at least one radical selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-heterocyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S, wherein $R_5$ is optionally interrupted by a radical selected from N, O and S.

5. The two-component composition according to claim 1, wherein $R_1$ and $R_2$ are in each case independently selected from the group consisting of C1-C6-alkyl;

$R_3$ and $R_4$ are in each case independently selected from the group consisting of C1-C6-alkyl;

n is an integer from 1 to 8; and $R_5$, if n=1 is, or if n>1 are in each case independently, selected from the group consisting of C1-C6-alkylene and C6-C8-arylene, each of which radicals is optionally substituted by at least one C1-C6-alkyl.

6. The two-component composition according to claim 1, wherein the acidic stabilizer is at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoroacetic acid, trichloroacetic acid, phosphoric acid, dichloroacetic acid, phenol.

7. The two-component composition according to claim 1, wherein the alkali accelerator is at least one selected from a base, a base precursor, or a base enhancer.

8. The two-component composition according to claim 7, wherein the alkali accelerator is at least one selected from metallic oxide, metallic hydroxide, amine, guanidine, amide, piperidine, piperazine, morpholine, pyridine, halides, salts of metal, ammonium, amine, wherein the anions in said salts is at least one selected from halogens, acetates, chloracetates, benzoates, aliphatic acids, alkene carboxylic acids, sulfurs, carbonates, silicates, diketones, monocarboxylic acids, polymers containing carboxylic acids.

9. The two-component composition according to claim 8, wherein the alkali accelerator is at least one selected from dimethylethylamine, dimethylpropylamine, 2-ethylhexylamine, di-(2-ethylhexyl)amine, dibutylamine, dicyclohexylamine, ditridecylamine mixture of isomers, N,N-dimethylisopropylamine, N-ethyldiisopropylamine, N,N-dimethylcyclohexylamine, N-Octylamine, tributylamine, tridecylamine mixture of isomers, tripropylamine, tris-(2-ethylhexyl)amine, triethylamine, trimethylamine, 2-(diisopropylamino)ethylamine, 3-(cyclohexylamino)propylamine, 3-(diethylamino)propylamine, 3,3'-dimethyl-4,4'-diaminodicyclohexylmethane, 4,4'-diaminodicyclohexylmethane, isophorone diamine, tetramethyl-1,6-hexanediamine, S-triazine, neopentanediamine (2,2-Dimethylpropane-1,3-diamine), octamethylenediamine, diethylenetriamine, dipropylene triamine, pentamethyldiethylenetriamine, N,N-Bis-(3-aminopropyl)methylamine, N3-Amine 3-(2-Aminoethylamino)propylamine, N4-Amine N,N'-Bis-(3-Aminopropyl)ethylenediamine, 4,9-Dioxadodecane-1,12-diamine, di-(2-methoxyethyl)amine, bis(2-dimethylaminoethyl) ether, polyetheramine D 2000, polyetheramine D 230, polyetheramine D 400, polyetheramine T 403, polyetheramine T 5000, N,N-Dimethylcyclohexylamine, N-methylmorpholine, 2,2'-Dimorpholinodiethylether, dimethylaminoethoxyethanol, bis(2-dimethylaminoethyl)ether, pentamethyldiethylenetriamine, trimethylaminoethylethanolamine, tetramethyl-1,6-hexanediamine, 1,8-diazabicyclo-5,4,0-undecene-7, 2,6-xylidine, 2-phenylethylamine, 4,4'-diaminodiphenylmethane, aniline, benzylamine, tris(dimethylaminomethyl)phenol, 2-dimethylaminomethylphenol (DMP10), diethanol-para-toluidine, diisopropanol-p-toluidine, N-(2-hydroxyethyl)aniline, N,N-di-(2-hydroxyethyl)aniline, N-ethyl-N-(2-hydroxyethyl) aniline, o-toluidine, p-nitrotoluene, 3-dimethylaminopropane-1-ol, butyldiethanolamine, triisopropanolamine, dibutylethanolamine, diethylethanolamine, methyldiethanolamine, methyldiisopropanolamine, N,N-dimethylethanolamine S, N,N-dimethylisopropanolamine, dimethylethanolamine, 4-(2-hydroxyethyl)morpholine, N,N,N',N'-Tetrakis(2-hydroxyethyl)ethylenediamine, sodium acetate, potassium acetate, zinc acetate, copper acetate, magnesium acetate, aluminium acetate, sodium chloracetate, potassium chloracetate, copper chloracetate, zinc chloracetate, magnesium chloracetate, aluminium chloracetate, ferric chloracetate, acid salts of sodium, potassium, lithium, copper, iron and cobalt, sodium oxide, potassium oxide, calcium oxide, zinc oxide, copper oxide, magnesium oxide, aluminium oxide, ferric and ferrous oxide, sodium hydroxide, potassium hydroxide, zinc hydroxide, copper hydroxide, magnesium hydroxide, aluminium hydroxide, calcium hydroxide, ferric and ferrous hydroxide, sodium silicate, potassium silicate, zinc silicate, copper silicate, magnesium silicate iron silicate, aluminium silicate, lithium chloride and tetramethyl guanidine.

10. The two-component composition according to claim 1, wherein the composition has a change rate of mass (%) concerning the base resistance and a water absorption rate (%), which are determined according to JSCE-E 549-2000, and they satisfy the following relation:

$$0.05 \times 10^{-2} \leq |C|^2/|W| \leq 5 \times 10^{-2}$$

wherein, C is abbreviation of change rate of mass concerning the base resistance, and W is abbreviation of the water absorption rate.

11. A mixture comprising the two-component composition according to claim 1.

12. The mixture according to claim 11, wherein the mixture is in substantial absence of a solvent.

13. A process for preparing the composition according to claim 1, comprising steps of:
(1) mixing the monomer (A), the polymer (B) and the acidic stabilizer (C) to obtain the component I; and
(2) preparing the component II.

14. A waterproofing coat comprising of the two-component composition according to claim 1.

15. A process which comprises applying wherein the two-component composition according to claim 1 as a waterproofing coat in a construction application to a substrate.

16. A process which comprises applying the two-component composition on a substrate selected from the group consisting of concrete, wood, metal and resin layer.

17. The process according to claim 16, wherein the resin layer is selected from the group consisting of cement-based resin layer, epoxy-based resin layer, polyurethane-based resin layer, acrylate-based resin layer, polyethylene layer, polypropylene layer, rubber layer, polyvinyl chloride layer, rubber layer, bitumen layer and polymer-modified bitumen layer.

18. A process which comprises applying the two-component composition on a wet substrate.

19. A process which comprises mixing component I and component II according to claim 1 before applying onto substrates.

20. A process which comprises applying component II is applied onto substrates first and component I is applied onto substrates in next step.

21. The two-component composition according to claim 1, wherein the monomer (A) is in an amount of from 10 to 60 wt. %, in each case based on the total weight of the monomer (A) and the polymer (B);
the acidic stabilizer (C) is in an amount of from 0.1 to 300 ppm; and
the component II is in an amount of from 0.05 to 5 wt. %, and in each case based on the total weight of the monomer (A) and the polymer (B).

22. The two-component composition according to claim 1, wherein the monomer (A) is in an amount of from 20 to 55 wt. %, in each case based on the total weight of the monomer (A) and the polymer (B);
the acidic stabilizer (C) is in an amount of from 0.1 to 200 ppm; and
the component II is in an amount of from 0.1 to 2 wt. %, and in each case based on the total weight of the monomer (A) and the polymer (B).

* * * * *